(12) United States Patent
Niemeyer et al.

(10) Patent No.: US 10,590,822 B2
(45) Date of Patent: Mar. 17, 2020

(54) METHOD FOR OPERATING AN EXHAUST AFTERTREATMENT SYSTEM HAVING AN SCR CATALYST

(71) Applicant: MTU FRIEDRICHSHAFEN GMBH, Friedrichshafen (DE)

(72) Inventors: Jens Niemeyer, Friedrichshafen (DE); Tim Späder, Langenargen (DE)

(73) Assignee: MTU FRIEDRICHSHAFEN GMBH, Friedrichshafen (DE)

( * ) Notice: Subject to any disclaimer, the term of this patent is extended or adjusted under 35 U.S.C. 154(b) by 0 days.

(21) Appl. No.: 15/742,823

(22) PCT Filed: Jun. 28, 2016

(86) PCT No.: PCT/EP2016/001094
§ 371 (c)(1),
(2) Date: Jan. 8, 2018

(87) PCT Pub. No.: WO2017/005348
PCT Pub. Date: Jan. 12, 2017

(65) Prior Publication Data
US 2018/0202339 A1    Jul. 19, 2018

(30) Foreign Application Priority Data
Jul. 7, 2015  (DE) ........................ 10 2015 212 700

(51) Int. Cl.
*F01N 3/20* (2006.01)
*F01N 11/00* (2006.01)

(52) U.S. Cl.
CPC .............. *F01N 3/208* (2013.01); *F01N 11/00* (2013.01); *F01N 2550/02* (2013.01);
(Continued)

(58) Field of Classification Search
CPC ........ F01N 11/00; F01N 3/208; F01N 3/2066; F01N 2550/02; F01N 2560/026;
(Continued)

(56) References Cited

U.S. PATENT DOCUMENTS 8,156,729 B2   4/2012  Sun
9,170,244 B2  10/2015  Niemeyer
(Continued)

FOREIGN PATENT DOCUMENTS

DE    102006007122 A1   8/2007
DE    102008008618 A1   6/2009
(Continued)

*Primary Examiner* — Patrick D Maines
*Assistant Examiner* — Dapinder Singh
(74) *Attorney, Agent, or Firm* — Lucas & Mercanti, LLP; Klaus P. Stoffel

(57) ABSTRACT

A method for operating a system having an internal combustion engine and an exhaust aftertreatment system having an SCR catalyst, wherein the internal combustion engine is controlled on the basis of at least one process parameter that influences a nitrogen oxide raw emission, wherein aging detection is performed for the SCR catalyst, wherein in a first operating mode of the internal combustion engine, if aging of the SCR catalyst is detected, the at least one process parameter is changed in the direction of a reduced nitrogen oxide raw emission, wherein the internal combustion engine is controlled on the basis of the changed at least one process parameter.

6 Claims, 3 Drawing Sheets

(52) U.S. Cl.
CPC .... *F01N 2560/026* (2013.01); *F01N 2590/02* (2013.01); *F01N 2590/08* (2013.01); *F01N 2590/10* (2013.01); *F01N 2610/02* (2013.01); *F01N 2900/0402* (2013.01); *Y02T 10/24* (2013.01); *Y02T 10/47* (2013.01)

(58) Field of Classification Search
CPC ............ F01N 2590/02; F01N 2590/08; F01N 2590/10; F01N 2610/02; F01N 2900/0402; Y02T 10/24; Y02T 10/47
USPC .................. 60/274, 277, 286, 295, 299–301
See application file for complete search history.

(56) References Cited

U.S. PATENT DOCUMENTS

2009/0158706 A1* 6/2009 Sun ..................... F01N 3/0231
60/274
2013/0263575 A1 10/2013 Sun

FOREIGN PATENT DOCUMENTS

| DE | 102011011441 B3 | 6/2012 |
| DE | 102013205583 A1 | 10/2013 |
| WO | 2015082805 A1 | 6/2015 |

* cited by examiner

METHOD FOR OPERATING AN EXHAUST AFTERTREATMENT SYSTEM HAVING AN SCR CATALYST

The present application is a 371 of International application PCT/EP2016/001094, filed Jun. 28, 2016, which claims priority of DE 10 2015 212 700.1, filed Jul. 7, 2015, the priority of these applications is hereby claimed and these applications are incorporated herein by reference.

BACKGROUND OF THE INVENTION

The invention relates to a method of operating a system comprising an internal combustion engine and an exhaust gas aftertreatment system, to a control unit for such a system, to an exhaust gas aftertreatment system, and to an internal combustion engine.

Exhaust gas aftertreatment systems comprising at least one catalyst for selective catalytic reduction of nitrogen oxides (SCR catalyst) are used to reduce nitrogen oxide emissions to legally stipulated values. Over a service life of the exhaust gas aftertreatment system, it is possible that the conversion rate that such an SCR catalyst can achieve will decrease. A typical design of a system comprising an internal combustion engine and such an exhaust gas aftertreatment system comprising an SCR catalyst takes account of this decrease in the performance of the SCR catalyst by means of a design reserve. This is also referred to as aging reserve. According to the specific application, the aging reserve may be very large in size. The effect of this is that the internal combustion engine in the new state of the system, with respect to the expected aging, is operated with raw nitrogen oxide emissions well below the emission level that could actually be run while complying with the legal limits by virtue of the as-new SCR catalyst, taking account of the aging reserve. These raw nitrogen oxide emissions, which tend to be too low, owing to the lack of exhaustion of the potential of the as-new SCR catalyst, lead to elevated consumption by the internal combustion engine, which is unfavorable for reasons of cost and also from environmental aspects. By means of recognition of aging, it is possible in principle to keep the nitrogen oxide emissions within the legally permissible range even in the case of aging of the SCR catalyst, but this does not solve the problem of excessive consumption with regard to the performance and conversion rate of a new SCR catalyst prior to commencement of the lifetime thereof.

SUMMARY OF THE INVENTION

It is an object of the invention to provide a method of operating a system comprising an internal combustion engine and an exhaust gas aftertreatment system comprising an SCR catalyst, a control unit for such a system, an exhaust gas aftertreatment system and an internal combustion engine, wherein the drawbacks mentioned do not occur.

The object is especially achieved in that a method of operating a system comprising an internal combustion engine and an exhaust gas aftertreatment system, wherein the exhaust gas aftertreatment system in turn has an SCR catalyst, is provided, having the following steps: The internal combustion engine is actuated on the basis of at least one process parameter that affects raw nitrogen oxide emission. Aging recognition for the SCR catalyst is conducted. If aging of the SCR catalyst is recognized, in a first mode of operation of the internal combustion engine, the at least one process parameter is changed in the direction of reduced raw nitrogen oxide emission, and the internal combustion engine is actuated on the basis of the changed at least one process parameter. By virtue of the process parameter being changed in the direction of reduced raw nitrogen oxide emission as a function of the recognition of aging, wherein the internal combustion engine is actuated on the basis of the changed process parameter and hence is caused to produce lower raw nitrogen oxide emission, it is possible to operate the internal combustion engine at the start of the lifetime of the SCR catalyst, when it is in an as-new state with high conversion rate, with comparatively high raw nitrogen oxide emission, which can be run down stepwise as aging of the SCR catalyst occurs. This makes it possible to optimize the internal combustion engine at the start of the lifetime of the SCR catalyst with exploitation of the high nitrogen oxide conversion rate of the as-new SCR catalyst and especially of the aging reserve with regard to minimum fuel consumption, and especially to tune it for low consumption. It is thus no longer necessary to operate the internal combustion engine unfavorably from the start merely because falling conversion rates of the SCR catalyst are to be expected toward the end of the lifetime thereof. Overall, it is thus possible to achieve low consumption values at the start of the lifetime of the internal combustion engine or of the SCR catalyst, which is favorable for reasons of cost and from environmental aspects.

An exhaust gas aftertreatment system is generally understood to mean a system set up to aftertreat exhaust gas from a unit connected upstream of the exhaust gas aftertreatment system, especially an engine, especially an internal combustion engine, wherein the aftertreatment reduces at least one pollutant concentration in the exhaust gas.

An SCR catalyst is especially understood to mean a catalytic unit set up to conduct selective catalytic reduction of nitrogen oxides, wherein a reaction of a reducing agent with the exhaust gas is effected, especially in the catalytic unit. The SCR catalyst is preferably set up to reduce nitrogen oxides by reaction with ammonia.

A process parameter that affects the raw nitrogen oxide emissions and is used within the scope of the method is preferably a target value for the raw nitrogen oxide emissions. It is possible that this target value is recorded in a characteristic map in an operating point-dependent manner, especially depending on an operating point of the internal combustion engine. The target value is preferably adjusted, especially lowered, preferably lowered in a stepwise or incremental manner, when aging of the SCR catalyst is recognized.

The target value for the raw nitrogen oxide emissions is preferably an input into a closed-loop raw emission control unit that preferably affects, as manipulated variable, at least one operating parameter of the internal combustion engine. The at least one operating parameter is preferably selected from the group consisting of an injection start, a boost pressure, a combustion air/fuel ratio, which is also referred to as lambda value, a high fuel pressure in a common high-pressure storage means for a multitude of injectors, which is also referred to as rail pressure, or at least one further suitable operating parameter of the internal combustion engine. The operating parameters mentioned here are suitable in a particular manner for affecting the raw nitrogen oxide emissions of the internal combustion engine.

Preferably, a first nitrogen oxide sensor is provided, which detects the raw nitrogen oxide emissions downstream of the internal combustion engine in an exhaust gas pathway. A measurement made by the first nitrogen oxide sensor is preferably an input into the closed-loop control unit for the raw nitrogen oxide emissions, where it is computed together with the current target value for the raw nitrogen oxide emissions, wherein the at least one operating parameter, as manipulated variable, is affected as a function of a variance of the actual raw nitrogen oxide emissions from the target.

Recognition of aging is generally understood to mean a method by which aging and especially a falling conversion rate of the SCR catalyst can be detected. The recognition of aging may especially be a recognition of breakthrough, or it is possible that the recognition of aging comprises recognition of breakthrough as a method step. For example, it is possible that, in the course of recognition of aging, a recognition of breakthrough is conducted, with adaptation of closed-loop emission control and especially of actuation of a dosage unit for a reducing agent into the exhaust gas pathway upstream of the SCR catalyst in reaction to recognition of a breakthrough of the SCR catalyst. It is preferably possible here that an altered conversion rate or a changed differential nitrogen oxide target concentration downstream of the SCR catalyst is determined, in which case it is still possible that this is recorded in a learning characteristic map.

A trigger used for a change in the at least one process parameter may be a breakthrough of the SCR catalyst which is recognized in the course of recognition of aging. Alternatively or additionally, it is possible that the trigger used for a change in the at least one process parameter is a new or altered entry in the learning characteristic map of the recognition of aging. The process parameter is thus more preferably changed when, in the course of recognition of aging, a breakthrough of the SCR catalyst is recognized, and/or when, in the course of recognition of aging, the learning characteristic map is changed, especially in the direction of a reduced conversion rate or a higher target concentration of nitrogen oxides downstream of the SCR catalyst. If a change in the learning characteristic map in the direction of a lower nitrogen oxide target concentration downstream of the SCR catalyst is also envisaged in the course of recognition of aging, for example in order to reverse an excessively great alteration in the other direction, such an event is preferably not used as a trigger for a change in the process parameter, in order not to unnecessarily reduce the raw nitrogen oxide emissions and hence to unnecessarily increase the consumption of the internal combustion engine.

The fact that the at least one process parameter is changed in the direction of reduced raw nitrogen oxide emission especially means that the at least one process parameter is changed such that, when the internal combustion engine is actuated on the basis of the changed at least one process parameter, it has lower raw nitrogen oxide emission than previously when it was actuated on the basis of the as yet unchanged at least one process parameter.

Raw nitrogen oxide emission here is especially understood to mean a nitrogen oxide concentration in the exhaust gas from the internal combustion engine upstream of the SCR catalyst and more preferably upstream of a dosage unit for a reducing agent or a reducing agent precursor product.

A dosage unit for dosage of a reducing agent is understood to mean a unit by means of which a reducing agent or a reducing agent precursor product can be dosed into the exhaust gas aftertreatment system upstream of the SCR catalyst. This may, for example, be a valve, an injector and/or a nozzle.

The term "reducing agent" encompasses both a reducing agent in the narrower sense, which can be reacted directly, without any further chemical change, with nitrogen oxides over the SCR catalyst for reduction thereof, and precursor products for reducing agents which first react with the exhaust gas to give the actual reducing agent, the latter then being reacted with the nitrogen oxides present in the exhaust gas over the SCR catalyst. An example of such a reducing agent precursor product is a urea/water solution, which is converted to ammonia under the conditions that exist in the exhaust gas stream, in which case the ammonia as the actual reducing agent in the narrower sense is then reacted with the nitrogen oxides over the SCR catalyst.

In a preferred embodiment of the method, closed-loop emission control in the first mode of operation is conducted on the basis of a constant determining parameter for the nitrogen oxide concentration downstream of the SCR catalyst. The closed-loop emission control here is especially implemented by actuation of the dosage unit for the reducing agent and/or the reducing agent precursor product, the dosage unit being dependent on the determining parameter which determines the nitrogen oxide concentration downstream of the SCR catalyst. This determining parameter is preferably a target nitrogen oxide concentration downstream of the SCR catalyst. There is preferably a second nitrogen oxide sensor provided downstream of the SCR catalyst, with which the nitrogen oxide concentration in the exhaust gas is detectable downstream of the SCR catalyst. The closed-loop emission control, i.e. the actuation of the dosage unit, is preferably effected with reference to the variance between the determining parameter and the actual concentration of nitrogen oxides downstream of the SCR catalyst detected by the second nitrogen oxide sensor. However, the term "actuate" includes both open-loop and closed-loop control.

The fact that the determining parameter is "constant" means here that it is not affected or changed as a function of aging of the SCR catalyst. This does not conflict with the fact that the determining parameter is preferably operating point-dependent, especially dependent on an operating point of the internal combustion engine, and is read off from a characteristic map preferably in an operating point-dependent manner. However, this characteristic map too remains constant in the sense that it is not changed as a function of aging of the SCR catalyst.

In the context of the first mode of operation of the internal combustion engine, the target nitrogen oxide concentration downstream of the SCR catalyst as determining parameter is preferably kept constant. The operation of the internal combustion engine is accordingly adapted to aging of the SCR catalyst in the first mode of operation preferably exclusively by lowering the raw nitrogen oxide emissions of the internal combustion engine.

Preference is given to an embodiment of the method wherein the SCR catalyst in operation is monitored permanently for aging. The recognition of aging is thus conducted continually during the operation of the SCR catalyst and hence especially also during the operation of the internal combustion engine. This has the advantage that it is possible to react very flexibly to any aging of the SCR catalyst that actually occurs in the real system, such that there is especially no requirement for a complex aging model which is difficult to provide with data.

Preference is also given to an embodiment of the method wherein the at least one process parameter in an initial state of operation is adjusted in the direction of fuel consumption-optimal operation of the internal combustion engine. This means especially that the target value for the raw nitrogen oxide emissions at the start of operation of the internal combustion engine, i.e. in the initial state of operation, is chosen such that, on one hand, the legal limits for the nitrogen oxide emissions are still observed on the basis of the high conversion rate of the as-new SCR catalyst including the aging reserve, but, on the other hand, these existing limits are exhausted in favor of a low consumption of the internal combustion engine, especially choosing as high as possible a target value for the raw nitrogen oxide emissions. In this way, it is possible to exploit the aging reserve in the form of the very high conversion rate of the SCR catalyst at the start of its lifetime, in order to distinctly lower the fuel consumption of the internal combustion engine.

In the context of the method, it is preferably the case that, where no aging is recognized by the recognition of aging, the at least one process parameter is kept constant. The raw nitrogen oxide emissions and especially the target value envisaged therefor are thus preferably not changed and especially not lowered if no aging of the SCR catalyst is recognized. Instead, these are merely lowered as required when aging and hence, more particularly, a reduced conversion rate of the SCR catalyst is indeed recognized. As a result, it is possible to keep the consumption of the internal combustion engine at a minimum level for a very long period, in a manner favorable both for the costs and from environmental aspects.

Preference is given to an embodiment of the method wherein the at least one process parameter, when aging of the SCR catalyst is recognized, is changed in the direction of a reduction in the raw nitrogen oxide emissions when the raw nitrogen oxide emission is greater than a predetermined minimal raw nitrogen oxide emission.

Raw nitrogen oxide emission or else "raw nitrogen oxide emissions" is understood here especially to mean a nitrogen oxide concentration in the exhaust gas downstream of an engine block of the internal combustion engine and upstream of an SCR catalyst and especially upstream of a dosage unit for a reducing agent or a reducing agent precursor product. Correspondingly, a predetermined minimal raw nitrogen oxide emission is preferably understood to mean a predetermined minimal concentration of nitrogen oxide downstream of an engine block of the internal combustion engine and upstream of the SCR catalyst and preferably upstream of the dosage unit for the reducing agent or for the reducing agent precursor product.

The minimal raw nitrogen oxide emission is preferably fixed such that, in the case of compliance with or exceedance of this value, compliance with other limits and reliable and stable operation of the internal combustion engine is assured. If, by contrast, the nitrogen oxide emission reaches or goes below the minimal raw nitrogen oxide emission, compliance with other limits, especially emissions limits, and/or reliable or stable operation of the internal combustion engine can no longer be assured.

For this reason, preferably, the at least one process parameter is changed in the direction of a reduction in the raw nitrogen oxide emission only when it is still greater than the level of the predetermined minimal raw nitrogen oxide emission because, otherwise, there is a risk of exceedance of other limits and/or reduced stability or reliability of the operation of the internal combustion engine.

Stable operation of the internal combustion engine is understood here to mean especially operation in which there is no risk either of misfiring operation, i.e. lack of ignition of a mixture in a combustion chamber of the internal combustion engine, or of knocking combustion in the combustion chamber. By contrast, unstable operation of the internal combustion engine is operation where misfiring, especially ignition misfiring, and/or knocking combustion occurs.

The change in the process parameter is preferably ended when the raw nitrogen oxide emission is greater than the predeterminedly minimal raw nitrogen oxide emission and, at the same time, no aging is recognized any longer. In this case, there is no longer any need for any change in the process parameter toward lower raw nitrogen oxide emission, and the internal combustion engine can still be operated at the raw nitrogen oxide emission that is then achieved with improved consumption compared to the level of the minimal raw nitrogen oxide emission.

Alternatively or additionally, the change in the process parameter is preferably ended when the raw nitrogen oxide emission reaches or goes below the level of minimal raw nitrogen oxide emission. This is because, in this case, there is a risk of exceedance of other limits and/or unstable operation of the internal combustion engine, and so it is favorable not to reduce the raw nitrogen oxide emission any further. Instead, in a preferred embodiment of the method, when the nitrogen oxide emission goes below the minimal raw nitrogen oxide emission, a limitation in the raw nitrogen oxide emission to the level of the minimal raw nitrogen oxide emission may be provided. The process parameter is then preferably kept constant in the continuation of the method, preferably with continued operation of the internal combustion engine at the level of the predetermined minimal raw nitrogen oxide emission.

Preference is given to an embodiment of the method in which the at least one process parameter is kept constant when aging of the SCR catalyst is recognized but, at the same time, the raw nitrogen oxide emission reaches or goes below the level of the predetermined minimal raw nitrogen oxide emission. Even further recognition of aging of the SCR catalyst then does not lead, especially from the point of view of compliance with further limits and/or stable operation of the internal combustion engine, to any further change in the process parameter. Instead, the internal combustion engine—as already elucidated—in this case preferably continues to be operated at the constant level of the predetermined minimal raw nitrogen oxide emission.

Preference is given to an embodiment of the method wherein the internal combustion operation is switched to a second mode of operation when the raw nitrogen oxide emission reaches or goes below the level of the predetermined minimal raw nitrogen oxide emission. In this second mode of operation, the closed-loop control of emission is conducted on the basis of a determining parameter for the nitrogen oxide concentration downstream of the SCR catalyst which is changed by the recognition of aging. Thus, in the second mode of operation, the closed-loop control of emission is no longer operated on the basis of the constant determining parameter, i.e., more particularly, a constant target nitrogen oxide concentration downstream of the SCR catalyst; instead, as a result of the recognition of aging, there is now a change in the determining parameter and hence, more particularly, the target nitrogen oxide concentration downstream of the SCR catalyst, in order to adapt the operation of the system composed of the internal combustion engine and the exhaust gas aftertreatment system to aging of the SCR catalyst. By means of this procedure, even with the process parameter kept constant and especially constant raw nitrogen oxide emission, adaptation to the aging and especially to a falling conversion rate of the SCR catalyst can be achieved with simultaneous compliance with legal limits.

The recognition of aging and especially also the change in the determining parameter on the basis of the recognition of aging is preferably conducted by means of a method which is elucidated in detail hereinafter:

This method especially has the following steps: A recognition of breakthrough for the SCR catalyst is conducted, wherein, when a breakthrough is recognized, the determining parameter is changed toward higher nitrogen oxide concentration downstream of the SCR catalyst.

In the first mode of operation, the dosage unit for dosage of a reducing agent is actuated on the basis of the constant determining parameter that affects the nitrogen oxide concentration downstream of the SCR catalyst. In the second mode of operation, the dosage unit for dosage of the reducing agent is actuated on the basis of the changed determining parameter.

By means of the recognition of breakthrough, it is especially possible to undertake adaptation to aging for the operation of the exhaust gas aftertreatment system, said adaptation—independently of any aging model—being adapted to the actual aging of the SCR catalyst. Thus, it is also possible to react flexibly to excessive aging of the system in operation, for which any design reserve may be insufficient. In these cases too, by means of the aging adaptation provided with the aid of the method, stable operation of the system is enabled. Unwanted slippage of reducing agent can be prevented in the second mode of operation by the actuation of the dosage unit on the basis of the changed determining parameter. More particularly, by means of the adaptation of aging conducted within the method, operating point-dependent limitation of the conversion rate demanded by the exhaust gas aftertreatment system is undertaken, in order to assure reliable operation of the system without reducing agent slippage even in the event of extreme aging.

Recognition of breakthrough is understood to mean a method by means of which any reducing agent slippage that occurs, especially ammonia slippage, through the SCR catalyst or elevated nitrogen oxide emission as a result of elevated ammonia conversion in an ammonia barrier catalyst downstream of the SCR catalyst can be recognized in operation. A method of conducting such a recognition of breakthrough, especially a dynamic recognition of breakthrough, is disclosed in German patent specification DE 10 2011 011 441 B3, reference being made to the teaching of this document. Preferably, the method of recognizing breakthrough which is disclosed therein is used in the context of the method proposed here.

More particularly, a dosage rate of a reducing agent added to the exhaust gas stream upstream of the SCR catalyst, using a model for the dynamic behavior of the SCR catalyst for at least one linear sensor characteristic that reflects the range of normal operation and at least one linear sensor characteristic that reflects the range of breakthrough or ammonia slippage, is used to determine an expected value for the conversion rate in each case. This expected value is compared to a real conversion rate determined from a measurement determined by a nitrogen oxide sensor arranged downstream of the SCR catalyst. For each characteristic, a respective manipulated variable for the adjustment of the real conversion rate to the expected value is calculated. That characteristic for which the smallest manipulated variable has been calculated is selected. Preferably, the monitoring here comprises the dynamic recognition of a catalyst breakthrough. Additionally or alternatively, the monitoring preferably comprises the determination of the maximum conversion rate of the SCR catalyst. Additionally or alternatively, preferably multiple different characteristics reflect the range of breakthrough. It is preferably the case that the various characteristics correspond to different maximum conversion rates. Additionally or alternatively, it is preferably the case that the parameters used in the model of the dynamic characteristics of the SCR catalyst are dependent on one or more operating parameter (s) of the SCR catalyst.

A breakthrough is thus especially understood to mean a state of the SCR catalyst in which the reducing agent dosed in by the dosage unit is not fully converted over the SCR catalyst; instead, a proportion of the reducing agent is flushed through the catalyst without reacting and is present in the exhaust gas downstream of the catalyst. The reducing agent, especially ammonia, leads to an elevated sensor signal at the nitrogen oxide sensor because it typically has cross-sensitivity between nitrogen oxides on the one hand and ammonia on the other hand. It is therefore possible, by means of the above-described method of recognizing breakthrough, especially using the measurements from the nitrogen oxide sensor, to detect breakthrough and especially ammonia slippage of the SCR catalyst.

The fact that the determining parameter is changed toward higher nitrogen oxide concentration downstream of the SCR catalyst when a breakthrough is recognized means more particularly that the determining parameter is changed such that there would be a tendency to expect a rise in the nitrogen oxide concentration downstream of the SCR catalyst owing to the alteration because of the changed determining parameter and the fundamental dependence of the nitrogen oxide concentration downstream of the SCR catalyst on the determining parameter.

However, this does not necessarily mean that the change in the determining parameter in the second mode of operation does indeed actually result in occurrence of a higher nitrogen oxide concentration downstream of the SCR catalyst. If, for example, the determining parameter is a target value for the nitrogen oxide concentration downstream of the SCR catalyst and the SCR catalyst is in a state of breakthrough, no closed-loop control of the nitrogen oxide concentration is possible any longer in this state of operation of the SCR catalyst. This tends to mean an elevated nitrogen oxide concentration downstream of the SCR catalyst. If the determining parameter is now changed toward higher nitrogen oxide concentration downstream of the SCR catalyst, which ultimately means that the target value for the closed-loop control of emission is raised, it is possible that stable closed-loop control of emission with the aged SCR catalyst becomes possible again. This is because, with the existing maximum conversion rate of the aged SCR catalyst, fulfillment of the new, changed target value is possible, whereas fulfillment of the preceding target value, before the change in the determining parameter, was no longer possible. It is then possible that, because the closed-loop control of emission is stable again, there is a fall in the nitrogen oxide concentration downstream of the SCR catalyst that actually occurs, even though the determining parameter tends to have been changed to higher nitrogen oxide concentration downstream of the SCR catalyst.

The fact that the dosage unit for dosage of the reducing agent is actuated on the basis of the changed determining parameter in the second mode of operation means more particularly that, rather than the original constant determining parameter, the changed determining parameter is now used in order to actuate the dosage unit, especially under open-loop or closed-loop control.

The dosage unit is preferably actuated on the basis of the determining parameter and additionally on the basis of a measurement signal from an exhaust gas sensor, especially a nitrogen oxide sensor, arranged downstream of the SCR catalyst. In this way, it is especially possible to conduct closed-loop control of emission for the exhaust gas aftertreatment system and especially for the SCR catalyst.

Preference is given to an embodiment of the method wherein the SCR catalyst in operation is monitored permanently for breakthrough. This means more particularly that the SCR catalyst, when exhaust gas is flowing through the exhaust gas aftertreatment system, i.e. it is in operation, is monitored for breakthrough continuously or at predetermined time intervals, especially periodically, especially with performance of a recognition of breakthrough by the above-described method, preferably continuously or at predetermined time intervals, especially periodically. This has the advantage that adaptation to aging for the exhaust gas aftertreatment system and especially for the SCR catalyst can be performed continually and especially from a first startup of the exhaust gas aftertreatment system. More particularly, there is thus no need either for an aging model or for recourse to an operating hours counter or any other unit for detection of an operating age of the exhaust gas aftertreatment system and/or the SCR catalyst.

Preference is given to an embodiment of the method wherein the determining parameter is a target nitrogen oxide concentration downstream of the SCR catalyst. In this case, a change in the target nitrogen oxide concentration downstream of the SCR catalyst toward a higher nitrogen oxide concentration downstream of the SCR catalyst means especially that the determining parameter is raised, i.e. changed toward a higher value. The determining parameter is preferably changed by recalculation of the determining parameter on the basis of an adaptation parameter. An adaptation parameter is understood to mean a parameter on which the determining parameter depends or which affects the determining parameter, or a parameter which is included in a calculation of the changed determining parameter. Preferably, the adaptation parameter is a predetermined nitrogen oxide conversion rate of the SCR catalyst.

It is especially the case that a change in the determining parameter is conducted by arithmetically combining the determining parameter with the adaptation parameter. The changed determining parameter is thus especially recalculated from the adaptation parameter when there is a change in the adaptation parameter. The adaptation parameter is preferably equal to a predetermined inertial value when an actual nitrogen oxide concentration—which is preferably detected by the exhaust gas sensor, especially the nitrogen oxide sensor downstream of the SCR catalyst—downstream of the SCR catalyst is equal to the determining parameter. An inertial value here is especially a value which is neutral with regard to the calculation of the determining parameter in the sense that there is no change in the determining parameter when the adaptation parameter has the inertial value. More particularly, a recalculation of the determining parameter on the basis of the inertial value does not lead to a change in the determining parameter. If the adaptation parameter used is a predetermined nitrogen oxide conversion rate of the SCR catalyst, and this predetermined conversion rate is expressed in percent, the inertial value, for example, is 1. If the actual nitrogen oxide concentration downstream of the SCR catalyst is equal to the determining parameter, there is no need to make any alteration, and so the adaptation parameter can advantageously be equated to the inertial value.

The adaptation parameter is especially chosen such that a reduction in the adaptation parameter leads to an increase in the determining parameter. If, for example, the adaptation parameter is a predetermined nitrogen oxide conversion rate over the SCR catalyst, the effect of a reduction in this conversion rate is an increase in the target nitrogen oxide concentration downstream of the SCR catalyst as changed determining parameter, because a smaller amount of nitrogen oxide per unit time can be converted over the SCR catalyst.

The adaptation parameter is preferably reduced when a breakthrough is recognized. This is because, if a breakthrough is recognized, this means more particularly that the conversion rate of the SCR catalyst has dropped—especially because of aging effects. The effect of this can especially be that closed-loop control of emission with the SCR catalyst is no longer possible, particularly by actuation of the dosage unit. If the nitrogen oxide conversion rate as adaptation parameter is now reduced in the course of the method, and the determining parameter is recalculated on the basis of this reduced conversion rate, this leads to a rise in the target nitrogen oxide concentration downstream of the SCR catalyst as changed determining parameter, with actuation of the dosage unit on the basis of this changed determining parameter, i.e. the raised target nitrogen oxide concentration. The effect of this in turn is advantageously that closed-loop control of emission by means of the SCR catalyst and the dosage unit becomes possible again since the SCR catalyst, in spite of aging, can reach the new target nitrogen oxide concentration by means of the new actuation of the dosage unit.

It is especially the case that the adaptation parameter is chosen such that an increase in the adaptation parameter leads to a decrease in the determining parameter. If, for example, the predetermined nitrogen oxide conversion rate of the SCR catalyst as adaptation parameter is increased, this ultimately means that it is expected that the SCR catalyst will have a greater conversion rate. In this case, there is preferably a drop in the target nitrogen oxide concentration downstream of the SCR catalyst as changed determining parameter, because stable closed-loop control of emission also appears possible at the lower target value. This can especially be utilized when the adaptation parameter has been reduced too significantly in a preceding step of the method and the determining parameter has been increased too significantly. It is then possible to restore the parameters, namely in particular to increase the adaptation parameter and reduce the determining parameter, in order that the nitrogen oxide emissions in operation of the exhaust gas aftertreatment system are not too high in systematic terms. This behavior can also be utilized when the SCR catalyst is being exchanged, in which case adaptation to the novel, preferably as-new and especially non-aged SCR catalyst is possible by increasing the adaptation parameter and reducing the determining parameter.

Preference is also given to an embodiment of the method wherein the determining parameter is a target nitrogen oxide concentration downstream of the SCR catalyst, especially for closed-loop control of emission from the SCR catalyst, wherein a change in the determining parameter is conducted by arithmetically combining the determining parameter with the adaptation parameter, wherein the adaptation parameter is preferably a predetermined differential nitrogen oxide concentration, especially a predetermined—positive or negative—addition value for additive calculation together with the target nitrogen oxide concentration. The adaptation parameter is thus preferably additively combined for calculation of the changed determining parameter with a predetermined and fixed initial value for the determining parameter in each case, wherein an increase in the adaptation parameter leads to an increase in the changed determining parameter, and wherein, moreover, lowering of the adaptation parameter preferably leads to lowering of the changed determining parameter. As already described above, the adaptation parameter is preferably equal to a predetermined inertial value when an actual nitrogen oxide concentration downstream of the SCR catalyst is equal to the determining parameter. The predetermined inertial value here, in the case of additive combination of the adaptation parameter with the predetermined fixed initial value, which especially remains fixed, for the target nitrogen oxide concentration as determining parameter, is especially equal to zero, because the additive combination in that case does not result in any change; instead, the predetermined initial value is used as determining parameter. The adaptation parameter is especially increased when a breakthrough is recognized. It is obvious that, in this way, the target nitrogen oxide concentration as determining parameter can be raised immediately as a reaction to a breakthrough, such that, more particularly, stable closed-loop control of emission is again possible by means of the SCR catalyst by actuation of the dosage unit.

Preference is also given to an embodiment of the method wherein the adaptation parameter is determined during a particular adaptation period in which the SCR catalyst is in a steady state. A steady state of the SCR catalyst and/or the exhaust gas aftertreatment system here especially means a state in which the exhaust gas temperature changes by not more than a predetermined temperature differential per unit time, for example by not more than 5° C. per minute, the state additionally lasting at least for a predetermined stabilization time, for example 30 seconds. Preferably, a steady state of the SCR catalyst means that it has an exhaust gas temperature which is constant in the aforementioned sense, and a predetermined exhaust gas mass flow rate, especially within predetermined limits. The determined adaptation period preferably lasts for as long as steady-state conditions exist over the SCR catalyst, i.e. it is arranged in the steady state. The adaptation parameter is thus preferably determined only when and only for as long as steady-state conditions exist over the SCR catalyst. If the SCR catalyst is in a non-steady state, especially a transient state, the adaptation parameter is preferably not determined, and/or the determination of the adaptation parameter is preferably stopped when non-steady-state, especially transient conditions, over the SCR catalyst occur. This is advantageous because, ultimately, reliable information about the state of aging of the SCR catalyst can be obtained only under steady-state conditions. Determination of the adaptation parameter under non-steady-state conditions as well, by contrast, harbors the risk that the actual aging of the SCR catalyst will not be detected accurately and hence the adaptation parameter will be determined incorrectly.

In the context of the method, therefore, it is preferably the case that, prior to determination of the adaptation parameter, it is checked whether the SCR catalyst is in a steady state, the adaptation parameter only being determined if the SCR catalyst is in a steady state. Moreover, it is preferably the case that the determination of the adaptation parameter is stopped when the steady state for the SCR catalyst ends.

Preference is also given to an embodiment of the method wherein the adaptation parameter within the particular adaptation period is changed incrementally toward higher nitrogen oxide concentration downstream of the SCR catalyst when a breakthrough is recognized. A change in the adaptation parameter toward higher nitrogen oxide concentration downstream of the SCR catalyst means here—analogously to the preceding remarks relating to the determining parameter—that the adaptation parameter is changed such that this results in a change in the determining parameter toward higher nitrogen oxide concentration downstream of the SCR catalyst. This does not necessarily mean—as likewise already set out above—that there will indeed be a rise in the nitrogen oxide concentration that occurs downstream of the SCR catalyst. Instead, owing to stable closed-loop control of emission which is possible again with the altered adaptation parameter and the changed determining parameter, it may be the case that there is a drop in the actual nitrogen oxide concentration downstream of the SCR catalyst.

The fact that the adaptation parameter is changed incrementally means more particularly that it is adapted in predetermined, especially constant adaptation steps, in which case an adaptation step preferably follows each recognized breakthrough. It is possible here that the adaptation parameter is calculated in an adaptation step with a predetermined adaptation factor, but it is also possible that the adaptation parameter is calculated with a predetermined summand in an adaptation step.

Overall, an incremental change in the adaptation parameter is thus preferably conducted every time a breakthrough is recognized in the specific adaptation period under steady-state conditions of the SCR catalyst.

The change in the adaptation parameter is preferably ended when no breakthrough is recognized any longer. This course of action is based on the idea that there is no longer a requirement for any adaptation of the adaptation parameter and of the determining parameter either when no breakthrough of the SCR catalyst can be detected any longer. Instead, it can be assumed that the adaptation parameter and also the determining parameter have been changed to a sufficient degree for stable operation of the SCR catalyst and of the exhaust gas aftertreatment system.

Preference is also given to an embodiment of the method wherein the adaptation parameter within the specific adaptation period is changed incrementally toward lower nitrogen oxide concentration downstream of the SCR catalyst when no breakthrough is recognized, and when the adaptation parameter is not equal to the predetermined inertial value. This course of action is based on the idea that overadjustment may have occurred in the event of a prior adjustment of the adaptation parameter toward higher nitrogen oxide concentration, as a result of which the nitrogen oxide emissions from the exhaust gas aftertreatment system will be too high in systematic terms. This overadjustment can advantageously be reversed when the adaptation parameter is changed back again, namely toward lower nitrogen oxide concentration, when no breakthrough is recognized any longer, although such a readjustment is conducted only when the adaptation parameter has indeed already been changed, i.e. does not correspond to the predetermined inertial value—preferably especially chosen as initial value at the start of the method. This is because, if the adaptation parameter is equal to the predetermined inertial value, this especially has a value adjusted to a non-aged, especially as-new SCR catalyst, in which case there is no point in readjusting the adaptation parameter toward lower nitrogen oxide concentration downstream of the SCR catalyst.

The change in the adaptation parameter toward lower nitrogen oxide concentration downstream of the SCR catalyst is preferably ended as soon as the adaptation parameter is equal to the predetermined inertial value. This especially corresponds to ending of the change when an initial starting value of the adaptation parameter is attained again and the condition for an as-new SCR catalyst is effectively re-established.

The change in the adaptation parameter toward lower nitrogen oxide concentration downstream of the SCR catalyst is preferably alternatively or additionally ended when a breakthrough is recognized. This course of action is based on the idea that a further change in the adaptation parameter toward lower nitrogen oxide concentration is no longer sensible when there is a breakthrough of the SCR catalyst, which especially means that successful closed-loop control of emission with the SCR catalyst is no longer possible with the current value of the changed determining parameter, such that there is no point in any further adjustment of the adaptation parameter effectively in the wrong direction. Preferably, when a breakthrough is recognized, a last alteration increment for the adaptation parameter, especially a last alteration increment toward lower nitrogen oxide concentration downstream of the SCR catalyst, is reversed again. This course of action is based on the idea that the last alteration step for the adaptation parameter toward lower nitrogen oxide concentration was apparently one step too many, because the catalyst is again in the state of breakthrough. There is the chance that reversing the last alteration increment will again establish a state in which the SCR catalyst can be utilized for successful closed-loop control of emission.

Preference is also given to an embodiment of the method wherein, in the case that the adaptation parameter is equal to the predetermined inertial value, the adaptation parameter in the specific adaptation period is kept equal to the predetermined inertial value when no breakthrough is recognized. In this way, it is advantageously possible to avoid any change in the adaptation parameter and hence also in the determining parameter if no relevant aging of the SCR catalyst is detectable, such that successful closed-loop control of emission with the SCR catalyst still also seems possible on the basis of the unchanged determining parameter.

Preference is also given to an embodiment of the method wherein a warning signal is generated on attainment or exceedance of a predetermined limit in the adaptation parameter, or on attainment or exceedance of a predetermined limit in the actual nitrogen oxide concentration downstream of the SCR catalyst. It is thus possible to signal to an operator of the exhaust gas aftertreatment system and especially an operator of an internal combustion engine connected upstream of the exhaust gas aftertreatment system that a critical state of the SCR catalyst has been attained, in which exceedance especially of a legal limit for nitrogen oxide emissions is possible, especially where compliance with the legal limit with the aged SCR catalyst no longer appears possible even with application of the method proposed here. In response to the warning signal, the operator can especially exchange the SCR catalyst for a newer or as-new SCR catalyst.

Alternatively or additionally to the generation of the warning signal, preference is given to initiating a decrease in a nitrogen oxide concentration in the exhaust gas upstream of the SCR catalyst. This means more particularly that an exhaust gas-generating unit connected upstream of the exhaust gas aftertreatment system, especially an internal combustion engine, is actuated in a changed manner, especially with changed operating parameters, such that the raw nitrogen oxide emissions from the upstream unit are reduced. In this way, it may especially still be possible to comply with a legal limit for the nitrogen oxide emissions from the exhaust gas aftertreatment system at least for a particular period of time in spite of the aged SCR catalyst before exchange of the SCR catalyst becomes necessary.

The nitrogen oxide concentration downstream of the SCR catalyst that results from the predetermined limit is preferably greater than or equal to the target nitrogen oxide concentration downstream of the SCR catalyst, i.e. is especially preferably greater than or equal to the determining parameter. This configuration is based on the idea that the determining parameter, and especially the target nitrogen oxide concentration downstream of the SCR catalyst, is to be especially less than or at most equal to a legal limit, in order to assure that the legal limit is always complied with if possible in the operation of the exhaust gas aftertreatment system.

Preference is also given to an embodiment of the method wherein data for determination of the adaptation parameter are recorded in an overwritable characteristic map during a first adaptation period, wherein the data are provided in a second adaptation period, wherein the second adaptation period follows after the first adaptation period in time. The expression "data for determination of the adaptation parameter" is especially understood to mean at least one item of data from which the adaptation parameter can be determined or derived. This may especially also be the current value of the adaptation parameter itself. The overwritable characteristic map is especially a learning characteristic map which is adjusted in the course of the adaptation of the operation of the exhaust gas aftertreatment system, especially with adjustment of the data for determination of the adaptation parameter to an actual aging state of the SCR catalyst. The fact that the data are recorded in the first adaptation period at an earlier juncture and provided in the second adaptation period at a later juncture means especially that—especially after interruption between two adaptation periods owing to a non-steady state of the SCR catalyst—the data for determination of the adaptation parameter from the last adaptation period can be used further in the subsequent adaptation period. In that case, there is thus no need for a completely new determination of the adaptation parameter in a next steady-state phase of the SCR catalyst after a non-steady-state phase; instead, it can be continued with the last value attained.

In the overwritable characteristic map, especially the learning characteristic map, the data or the adaptation parameter are preferably recorded as a function of a temperature of the SCR catalyst or an exhaust gas temperature in the SCR catalyst, and an exhaust gas mass flow rate. The adaptation parameter itself is thus preferably operating point-dependent, and is recorded in operating point-dependent form in the learning characteristic map.

Alternatively or additionally, it is also possible that a current value for the changed determining parameter in the first adaptation period is recorded in the overwritable characteristic map, and is then provided in the second adaptation period. In this case, the current value for the changed determining parameter can also be used as an item of data for determination of the adaptation parameter, especially when the current value for the changed determining parameter in each case is calculated from a predetermined, fixed initial value for the determining parameter and the current adaptation parameter. In this case, the adaptation parameter can be determined by means of simple calculation of the current, changed determining parameter with the predetermined, fixed determining parameter.

The use of an overwritable characteristic map, especially a learning characteristic map, also makes it possible to use, for the target nitrogen oxide concentration downstream of the SCR catalyst, as determining parameter, a predetermined characteristic map which is fixed, i.e. constant over time, from which, especially in an operating point-dependent manner, the predetermined, fixed initial value for the determining parameter is read off in each case and is then computed together with the adaptation parameter for calculation of the current, changed determining parameter. This has the advantage that the characteristic map of the initial values is always preserved, with the possibility of direct access to these initial values again—especially after exchange of an SCR catalyst.

The predetermined, fixed initial value for the determining parameter is preferably not a single value but a multitude of operating point-dependent values that are preferably recorded in a characteristic map. This characteristic map is preferably configured as a fixed, steady-state, especially non-overwritable characteristic map.

The predetermined, fixed initial value for the determining parameter is thus preferably recorded in a characteristic map as a function of a state of operation of a unit connected upstream of the exhaust gas aftertreatment system, especially an internal combustion engine. More preferably, the predetermined, fixed initial value is recorded in the characteristic map as a function of a speed and a torque of the internal combustion engine. It is then always possible to read out, in an operating point-dependent manner, a value for the predetermined, fixed initial value from the characteristic map.

Preference is also given to an embodiment of the method wherein the overwritable characteristic map is not written with data in predetermined states of operation of the exhaust gas aftertreatment system, or in predetermined states of operation of a unit operatively connected to the exhaust gas aftertreatment system, especially an exhaust gas-generating unit.

This has the advantage that the overwritable characteristic map is not filled with data when states of operation occur in which no viable or realistic determination of the state of aging of the SCR catalyst is possible, even when it is in a steady state. The predetermined states of operation are preferably selected correspondingly.

It is possible that a change in the adaptation parameter is nevertheless also undertaken in such predetermined states of operation, if steady-state conditions exist over the SCR catalyst, but the changed values for the adaptation parameter in that case are not recorded in the overwritable characteristic map. In such states of operation, the dosage unit is actuated on the basis of the changed determining parameter, but there is no recording, i.e. storage of a corresponding value, in order to prevent maladjustment of the learning characteristic map.

Alternatively, it is also possible that there is no adjustment of the adaptation parameter at least in some predetermined states of operation of this kind, such that the exhaust gas aftertreatment system is then operated with the determining parameter kept constant.

Such a predetermined state of operation exists, for example, when there is a failure of a sensor for detection of a high pressure in a common high-pressure storage means to which a multitude of injectors are assigned, namely what is called a rail pressure sensor. In this case, the torque calculation for an internal combustion engine becomes inexact, and the calculation of a target nitrogen oxide concentration based on the incorrectly determined, current state of operation gives incorrect values. In this case, there is preferably no recording of data in the overwritable characteristic map. It is then especially also possible to prevent any change in the adaptation parameter.

A further predetermined state of operation of this kind exists when there is a failure of a speed sensor of an internal combustion engine. Operation is then typically switched to a camshaft sensor, which leads to inexactness in a determination of commencement of injection from injectors, and hence to changed combustion in combustion chambers of the internal combustion engine, and to altered emission values. In this case, preferably, the adaptation parameter is still changed, but the changed values are not stored in the overwritable characteristic map.

Even when exhaust gas recycling for the internal combustion engine is shut down owing to excess temperature, which leads to elevated raw nitrogen oxide emission, the adaptation is still conducted, but no data are stored in the learning characteristic map.

In the case of elevated hydrocarbon emissions too, for example owing to a cold start of an internal combustion engine or an active regeneration of a particulate filter, there is preferably no recording of data in the overwritable characteristic map, since such states of operation are typically not covered by a catalyst model.

The trigger event or triggering event used for the change in the process parameter in the first mode of operation of the internal combustion engine is preferably a breakthrough of the SCR catalyst recognized via the recognition of aging. Alternatively or additionally, it is possible that a change in the adaptation parameter or the data in the overwritable characteristic map, especially the learning characteristic map, toward a higher nitrogen oxide concentration downstream of the SCR catalyst is used as the triggering event or trigger event for the change in the process parameter. In this respect, a change in the overwritable characteristic map is preferably monitored, it being possible that a new entry in the learning characteristic map or a change thereof in the direction of a higher nitrogen oxide concentration downstream of the SCR catalyst triggers a change in the process parameter in the direction of reduced raw nitrogen oxide emission in the first mode of operation of the internal combustion engine.

In the first mode of operation of the internal combustion engine as well, the overwritable characteristic map is preferably adjusted and the determining parameter is changed. However, the changed determining parameter is not used for closed-loop control of emission, but is effectively calculated merely passively and optionally stored. Instead, the closed-loop control of emission is based on the unchanged determining parameter, especially on the basis of an initial value of the determining parameter that has been kept constant.

In the second mode of operation of the internal combustion engine, in contrast, the changed determining parameter is used for closed-loop control of emission. The preceding adjustment or change in the determining parameter to the aging of the SCR catalyst in the first mode of operation, although it is not used for closed-loop control of emission, has the advantage here that aging-adjusted values for the changed determining parameter for closed-loop control of emission are immediately available when the internal combustion engine is switched from the first mode of operation to the second mode of operation.

The object is also achieved by providing a control unit for a system comprising an internal combustion engine and an exhaust gas aftertreatment system comprising an SCR catalyst. This control unit is set up to actuate the internal combustion engine on the basis of at least one process parameter that affects raw nitrogen oxide emission, wherein the control unit is set up to conduct a recognition of aging for the SCR catalyst, and, in a first mode of operation of the internal combustion engine, to change the at least one process parameter in the direction of reduced raw nitrogen oxide emission when aging of the SCR catalyst is recognized. The control unit is further set up to actuate the internal combustion engine on the basis of the at least one changed process parameter. The control unit is preferably set up to conduct a method according to one of the embodiments described above.

Particularly the advantages that have already been elucidated in connection with the method arise in connection with the control unit.

The control unit may take the form of a control device which is assigned to the exhaust gas aftertreatment system, and which can then preferably be operatively connected to a control device for the internal combustion engine for the purpose of actuation thereof, for example via an interface suitable for the purpose.

Alternatively, it is possible that the control unit takes the form of a control device for the internal combustion engine, especially of a central control device in the internal combustion engine (engine control unit—ECU), or that the central control device of the internal combustion engine adopts the functionality of the control unit.

It is also possible that the control unit has a multitude of different control devices which assume various component functions of the control unit, in which case the control devices communicate with one another and are especially operatively connected to one another—preferably via interfaces.

It is possible that the method is implemented in a fixed manner into an electronic structure, especially an item of hardware, of the control unit. Alternatively or additionally, it is possible that a computer program product has been loaded into the control unit, having machine-readable instructions on the basis of which an embodiment of the method can be performed when the computer program product is running on the control unit.

In this connection, preference is also given to a computer program product having machine-readable instructions on the basis of which a method according to any of the above-described embodiments can be performed when the computer program product is running on a processing unit, especially a control unit, more preferably a control device of an internal combustion engine.

The invention also includes a data carrier comprising such a computer program.

The object is also achieved by providing an exhaust gas aftertreatment system comprising at least one SCR catalyst and a control unit according to one of the above-described working examples. Particularly the advantages that have already been elucidated in connection with the method and the control unit arise in connection with the exhaust gas aftertreatment system.

The exhaust gas aftertreatment system also preferably has a dosage unit for a reducing agent or a reducing agent precursor product, wherein the dosage unit is provided upstream of the SCR catalyst. The control unit is preferably operatively connected to the dosage unit.

In addition, the exhaust gas aftertreatment system preferably has a first nitrogen oxide sensor arranged downstream of a connection of the exhaust gas aftertreatment system to an engine block of an internal combustion engine and upstream of the SCR catalyst, and preferably upstream of the dosage unit. The exhaust gas aftertreatment system preferably has a second nitrogen oxide sensor arranged downstream of the SCR catalyst. The control unit is preferably operatively connected to the first nitrogen oxide sensor and/or to the second nitrogen oxide sensor.

The exhaust gas aftertreatment system preferably has a determination unit for determining raw nitrogen oxide emission. The determination unit may be the first nitrogen oxide sensor or a means of determination which is connected to the first nitrogen oxide sensor and evaluates a signal from the first nitrogen oxide sensor. Alternatively, it is also possible that the determination unit is a means of determination which calculates the raw nitrogen oxide emission on the basis of a model or a simulation, especially from operating parameters of the internal combustion engine.

The exhaust gas aftertreatment system also preferably has a determination unit for determining a nitrogen oxide emission downstream of the SCR catalyst. This may be the second nitrogen oxide sensor, or else a means of determination operatively connected to the second nitrogen oxide sensor in order to evaluate a measurement signal from the second nitrogen oxide sensor. Alternatively or additionally, it is also possible that the determination unit takes the form of a means of determination which calculates the nitrogen oxide emission downstream of the SCR catalyst using a model or a simulation of the internal combustion engine, the dosage unit and the SCR catalyst, especially on the basis of operating parameters thereof.

The object is finally also achieved by providing an internal combustion engine having a control unit according to any of the above-described working examples. Alternatively or additionally, the internal combustion engine preferably comprises an exhaust gas aftertreatment system according to any of the above-described working examples, or is operatively connected to such an exhaust gas aftertreatment system.

Particularly the advantages that have already been elucidated in connection with the method, the control unit and the exhaust gas aftertreatment system arise in connection with the internal combustion engine.

The internal combustion engine preferably takes the form of a reciprocating piston engine. It is possible that the internal combustion engine is set up to drive a passenger vehicle, a heavy goods vehicle or a utility vehicle. In a preferred working example, the internal combustion engine serves to drive land or water vehicles, heavy vehicles in particular, for example mine vehicles, trains, wherein the internal combustion engine is used in a locomotive or a power car, or ships. It is also possible to use the internal combustion engine to drive a motor vehicle serving for defense purposes, for example a tank. A working example of the internal combustion engine is preferably also used in stationary form, for example for stationary energy supply in emergency power operation, continuous load operation or peak load operation, in which case the internal combustion engine preferably drives a generator. Another possibility is stationary use of the internal combustion engine for driving of auxiliary appliances, for example of firefighting pumps on oil rigs. In addition, it is possible to use the internal combustion engine in the field of production of fossil raw materials and especially fuels, for example oil and/or gas. It is also possible to use the internal combustion engine in the industrial sector or in the construction sector, for example in a construction or building machine, for example in a crane or a digger. The internal combustion engine preferably takes the form of a diesel engine, a gasoline engine, or a gas engine for operation with natural gas, biogas, special gas or another suitable gas. Especially when the internal combustion engine takes the form of a gasoline engine, it is suitable for use in a combined heat and power plant for stationary energy generation.

The description of the method on the one hand and of the control unit, the exhaust gas aftertreatment system and the internal combustion engine on the other hand should be regarded as being complementary to one another. More particularly, method steps that have been described explicitly or implicitly in connection with the control unit, the exhaust gas aftertreatment system and/or the internal combustion engine, preferably individually or combined with one another, are steps of a preferred embodiment of the method. Features of the control unit, the exhaust gas aftertreatment system and/or the internal combustion engine that have been elucidated explicitly or implicitly in connection with the method, preferably individually or in combination with one another, are features of a preferred working example of the control unit, the exhaust gas aftertreatment system and/or the internal combustion engine. The method preferably features at least one method step occasioned by at least one feature of an inventive or preferred working example of the control unit, the exhaust gas aftertreatment system and/or the internal combustion engine. The control unit, the exhaust gas aftertreatment system and/or the internal combustion engine preferably feature(s) at least one feature occasioned by at least one step of an inventive or preferred embodiment of the method.

BRIEF DESCRIPTION OF THE DRAWING

The invention is elucidated in detail hereinafter with reference to the drawing. The figures show.

DETAILED DESCRIPTION OF THE INVENTION

Figure 1:
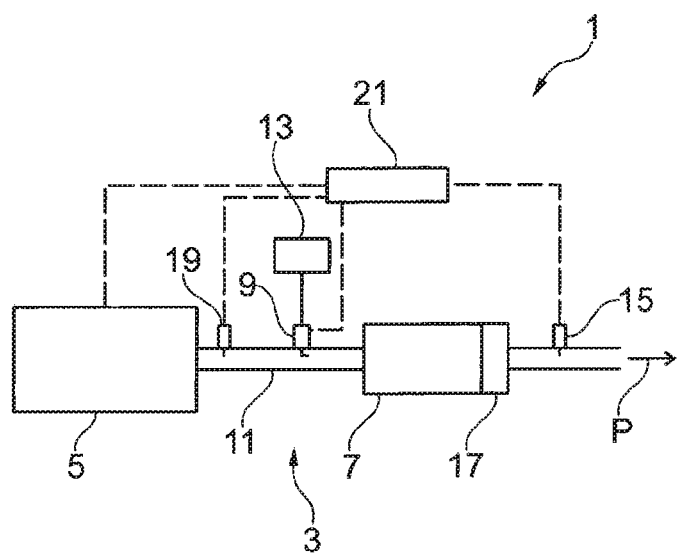
FIG. 1 a schematic diagram of a working example of an internal combustion engine comprising an exhaust gas aftertreatment system.

FIG. 1 shows a schematic diagram of a working example of an internal combustion engine 1 having an exhaust gas aftertreatment system 3. The internal combustion engine 1 has an engine block 5, wherein exhaust gas from the engine block 5 can flow along the exhaust gas aftertreatment system 3 and—as indicated here schematically by an arrow P—further to an outlet or exhaust which is not shown.

The exhaust gas aftertreatment system 3 has a catalyst for selective catalytic reduction of nitrogen oxides, namely an SCR catalyst 7. Downstream of the SCR catalyst 7 is arranged a dosage unit 9 set up for dosage of a reducing agent or a reducing agent precursor product, especially a urea/water solution. The exhaust gas aftertreatment system 3 also has an exhaust gas pathway 11 through which the exhaust gas flows, and in which the dosage unit 9 and the SCR catalyst 7 are arranged.

The dosage unit 9 is in fluid connection to a reservoir 13 for the reducing agent or the reducing agent precursor product.

It is optionally the case that, downstream of the SCR catalyst 7, especially immediately adjoining it, an oxidation catalyst 17 is arranged as barrier catalyst, which is set up to oxidize reducing agent, especially ammonia, that escapes from the SCR catalyst 7, especially to form nitrogen oxides, and hence to reduce or to prevent escape of reducing agent from the SCR catalyst 7 or from the exhaust gas aftertreatment system 3.

Along the exhaust gas pathway 11, a first nitrogen oxide sensor 19 is arranged downstream of the engine block 5 and upstream of the SCR catalyst 7 and preferably also upstream of the dosage unit 9, wherein raw nitrogen oxide emissions from the internal combustion engine 1 are detectable by the first nitrogen oxide sensor 19.

Downstream of the SCR catalyst 7 and preferably downstream of the oxidation catalyst 17 is arranged a second nitrogen oxide sensor 15 set up to detect a nitrogen oxide concentration in the exhaust gas downstream of the SCR catalyst 7. This second nitrogen oxide sensor 15 is simultaneously also suitable for recognition of breakthrough of the SCR catalyst 7 because its measurement signal is sensitive to breakthrough. If the oxidation catalyst 17 is not provided, in the state of breakthrough, reducing agent will get out of the SCR catalyst 7 into the region of the second nitrogen oxide sensor 15, which has cross-sensitivity between nitrogen oxides on the one hand and reducing agent, especially ammonia, on the other hand. There will thus also be a rise in the measurement signal from the second nitrogen oxide sensor 15 when there is a rise in a reducing agent concentration, especially an ammonia concentration, in the exhaust gas at the measurement position of the second nitrogen oxide sensor 15. If, by contrast, an oxidation catalyst 17 is provided, in the case of breakthrough of the SCR catalyst 7, there will be a rise in the measurement signal from the second nitrogen oxide sensor 15 because the reducing agent that slips through the SCR catalyst 7, especially ammonia, is oxidized in the oxidation catalyst 17, especially to form nitrogen oxides, which are then detected directly by the second nitrogen oxide sensor 15 as an elevated measurement signal.

A control unit 21 is provided, which is especially operatively connected to the first nitrogen oxide sensor 19 and preferably to the second nitrogen oxide sensor 15 for detection of the measurement signals from at least one of these sensors. The control unit 21 is also preferably operatively connected to the dosage unit 9 for actuation thereof, especially for specification of an amount of reducing agent injected into the exhaust gas pathway 11 by the dosage unit 9. In addition, the control unit 21 is preferably operatively connected to the engine block 5, especially for detection of operating parameters of the engine block 5 and/or for actuation thereof.

The control unit is especially set up to actuate the internal combustion engine 1 and here specifically especially the engine block 5 on the basis of at least one process parameter that affects raw nitrogen oxide emission. Moreover, the control unit is set up to conduct recognition of aging for the SCR catalyst 7, and, in a first mode of operation of the internal combustion engine 1, to change the at least one process parameter in the direction of reduced raw nitrogen oxide emission when aging of the SCR catalyst 7 is recognized. The control unit 21 is set up to actuate the internal combustion engine 1, especially the engine block 5, on the basis of the at least one changed process parameter. More particularly, the control unit 21 is set up to conduct one of the above-described embodiments of the method of the invention.

Figure 2:
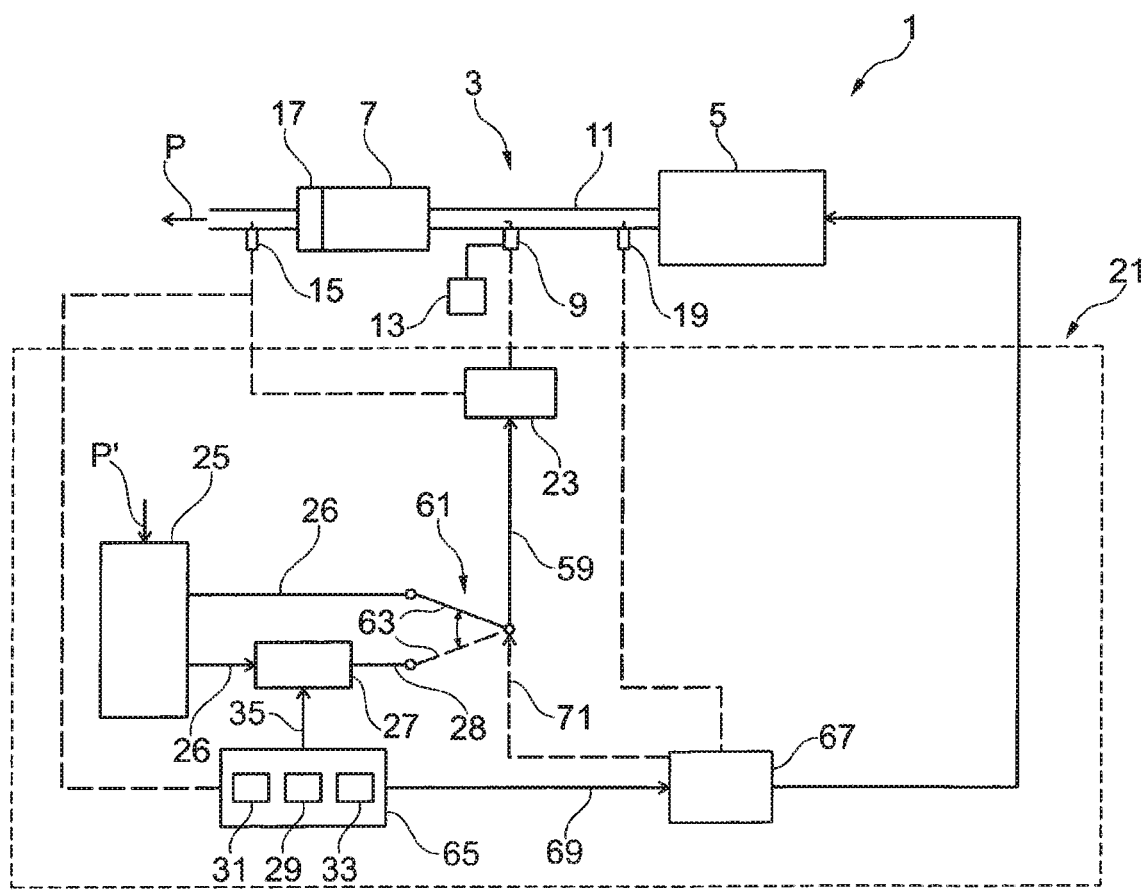
FIG. 2 a schematic diagram of an embodiment of the method.

FIG. 2 shows a schematic diagram of an embodiment of the method. Identical elements and those having the same function are given the same reference numerals, and so reference is made to the preceding description in this respect. This especially gives a detailed elucidation of the mode of function of the control unit 21. The control unit 21 has a means of closed-loop emission control 23, which is set up for closed-loop control of the nitrogen oxide emissions, especially for closed-loop control of a nitrogen oxide concentration, downstream of the SCR catalyst 7. For this purpose, the means of closed-loop emission control 23 is operatively connected to the second nitrogen oxide sensor 15 on the one hand and to the dosage unit 9 on the other hand. By means of the operative connection to the second nitrogen oxide sensor 15, more particularly, it is possible to detect an actual value for the nitrogen oxide concentration downstream of the SCR catalyst 7 by means of the means of closed-loop emission control 23. The means of closed-loop emission control 23 is supplied with a target value 59, the means of closed-loop emission control 23 being set up to determine a variance of the actual nitrogen oxide concentration downstream of the SCR catalyst 7 from the target value, and to actuate the dosage unit 9 as a function of the variance from the target value, in order to regulate the nitrogen oxide concentration downstream of the SCR catalyst 7 to the target value 59.

In the first mode of operation, a switch unit 61 shown here in schematic form is arranged in a first function setting represented here by means of a solid switch symbol 63, in which case the means of closed-loop emission control 23 is supplied, as target value 59, with a determining parameter 26 which is read off from a first characteristic map 25 as a function of operating parameters of the internal combustion engine 1 represented here by a second arrow P', especially a current speed and a current torque. The first characteristic map 25 comprises constant values for the determining parameter 26 which are kept constant and are not changed in the operation of the internal combustion engine 1.

The control unit 21 has a means of aging recognition 65 which is set up to conduct recognition of aging for the SCR catalyst 7. For this purpose, the means of aging recognition 65 is especially operatively connected to the second nitrogen oxide sensor 15. This means of aging recognition 65 preferably has a steady-state recognition element 33 and a breakthrough recognition element 31, which will be elucidated in detail hereinafter. Moreover, the means of aging recognition 65 preferably has a calculation element 29, which will likewise be elucidated in detail hereinafter, and which is set up to calculate a calculation result 35 which is supplied to a change element 27. In the change element 27, the determining parameter 26 read off from the first characteristic map 25 is combined with the calculation result 35, or the change element 27 makes a decision between the determining parameter 26 and the calculation result 35, which will be elucidated in detail hereinafter. In any case, the change element 27 results in a changed determining parameter 28.

In the second mode of operation of the internal combustion engine 1, the switch unit 61 is arranged in a second function setting represented here by a dotted representation of the switch symbol 63. At the same time, the switchability of the switch unit 61 from the first to the second function position and back is indicated by a double arrow. In the second function setting, the changed determining parameter 28 is sent to the means of closed-loop emission control 23 as target value 59.

The control unit 21 also has a means of closed-loop raw emission control 67, which is set up to regulate the raw nitrogen oxide emissions from the internal combustion engine 1 and especially the engine block 5. For this purpose, the means of closed-loop raw emission control 67 is operatively connected to the first nitrogen oxide sensor 19, the measurement from which is used as the actual value for the raw nitrogen oxide emission. The means of closed-loop raw emission control 67 in the new condition of the internal combustion engine 1 and/or in the new condition of the SCR catalyst 7 has a target value for the raw nitrogen oxide emissions which is optimized with regard to a consumption of the internal combustion engine 1 and is thus comparatively high. In this way, more particularly, the aging reserve of the as-new SCR catalyst 7 is exploited, in order to obtain maximum favorability of consumption of the internal combustion engine 1.

Via the means of aging recognition 65, recognition of aging for the SCR catalyst 7 is conducted. More particularly, aging of the SCR catalyst 7 is recognized when the breakthrough recognition element 31 recognizes a breakthrough of the SCR catalyst 7 and/or when an adaptation parameter or data that determine the adaptation parameter in an overwritable characteristic map, especially a learning characteristic map, of the means of aging recognition 65 is/are altered in the direction of a higher nitrogen oxide concentration downstream of the SCR catalyst 7. In such a case, the means of aging recognition 65 sends a signal 69, which may also take the form of a virtual signal, especially of a bit or bit pattern, to the means of closed-loop raw emission control 67, and then the means of closed-loop raw emission control 67 is caused to lower the target value for the raw nitrogen oxide emissions. Preferably, the means of closed-loop raw emission control 67 lowers the target value for the raw nitrogen oxide emissions incrementally, especially by a constant increment, especially every time it receives the signal 69 indicating aging of the SCR catalyst 7 from the means of aging recognition 65.

The target value for the raw nitrogen oxide emissions and the measurement signal from the first nitrogen oxide sensor 19 obtained as the actual value are used by the means of closed-loop emission control 67 to calculate a variance of the target value for the raw nitrogen oxide emission from the actual value, and it actuates the internal combustion engine 1, especially the engine block 5, as a function of the variance in order to regulate the raw nitrogen oxide emissions to the current target value. The means of closed-loop raw emission control 67 preferably affects at least one operating parameter of the internal combustion engine 1 in order to regulate the raw nitrogen oxide emissions, more preferably an operating parameter selected from the group consisting of an injection start, a boost pressure, a lambda value, and a rail pressure. Additionally or alternatively, it is also possible to affect at least one other suitable operating parameter of the internal combustion engine 1, especially the engine block 5, via the means of closed-loop raw emission control 67.

In the first mode of operation of the internal combustion engine 1, overall, the means of closed-loop emission control 23 is thus also supplied with a constant target value 59 in the form of the determining parameter 26 read off from the first characteristic map 25, "constant" here meaning that this target value, especially the determining parameter 26, is not affected or changed as a function of aging of the SCR catalyst 7. This does not conflict with the fact that the determining parameter 26 and hence the target value 59 are read off from the characteristic map 25 in an operating point-dependent manner and in this respect are variable.

At the same time, the system reacts to aging of the SCR catalyst recognized via the means of aging recognition 65 in that the raw nitrogen oxide emissions are lowered.

The first mode of operation is preferably maintained until the target value for the raw nitrogen oxide emission reaches or goes below a predetermined minimal raw nitrogen oxide emission. If the target value for the raw nitrogen oxide emission goes below the predetermined minimal raw nitrogen oxide emission, it is preferably the case that the target value is limited at the lower end to the minimal raw nitrogen oxide emission, and is especially raised to this level. The predetermined minimal raw nitrogen oxide emission is preferably determined such that compliance with other emission limits and/or stable operation of the internal combustion engine at the level of the minimal raw nitrogen oxide emission can still be assured, whereas there would be a risk below the minimal raw nitrogen oxide emission that at least one other emission limit can no longer be complied with, or that the operation of the internal combustion engine 1 will become unstable.

The first mode of operation preferably ends especially when further lowering of the raw nitrogen oxide emissions is no longer appropriate for overriding reasons, especially with regard to other emission limits and/or stable operation of the internal combustion engine 1.

The predetermined minimal raw nitrogen oxide emission is preferably recorded as a constant value in the means of closed-loop raw emission control 67.

In the case that the target value for the raw nitrogen oxide emission reaches or goes below the predetermined minimal raw nitrogen oxide emission, the means of closed-loop raw emission control 67 preferably sends a second signal 71 to the switch unit 61, as a result of which it is switched from its first function position to the second function position. As a result, at the same time, the internal combustion engine 1 is switched to its second mode of operation.

In the second mode of operation, the target value for the raw nitrogen oxide emissions in the means of closed-loop raw emission control 67 is now preferably kept constant, more preferably at the level of the predetermined minimal raw nitrogen oxide emission.

At the same time, the means of closed-loop emission control 23 is supplied, as target value 59, with the changed determining parameter 28 which is determined by the change element 27.

Further aging of the SCR catalyst 7 is thus no longer taken into account by lowering of the raw nitrogen oxide emissions, but by changing the target value 59 for the means of closed-loop emission control 23.

Moreover, it is preferably the case that, after exchange of the SCR catalyst 7 for an as-new SCR catalyst 7, the changed determining parameter 28 is restored stepwise, especially to the level of the determining parameter 26, with a corresponding setup of the means of aging recognition 65. Preferably, the means of aging recognition 65 is additionally set up, in such a case, to transmit a suitable signal to the means of closed-loop raw emission control 67, such that it can raise the raw nitrogen oxide emissions again, especially to the level of the as-new internal combustion engine 1 or the as-new SCR catalyst 7. In such a case, the means of closed-loop raw emission control 67 preferably also actuates the switch unit 61 again, such that it is returned from its second function position to its first function position, whereupon the means of closed-loop emission control 23 is again actuated with the constant determining parameter 26 as target value 59.

In this way, after exchange of the SCR catalyst 7 for an as-new SCR catalyst 7, it is possible again to establish operation of the internal combustion engine 1 corresponding to a new state. The procedure in connection with the recognition of aging then effectively starts again from the beginning.

It is found that the internal combustion engine 1 is actuated on the basis of the process parameter that affects raw nitrogen oxide emission, namely the target value for the raw nitrogen oxide emission in the means of closed-loop raw emission control 67, wherein recognition of aging for the SCR catalyst 7 is conducted via the means of aging recognition 65, wherein, when aging of the SCR catalyst 7 is recognized, the at least one process parameter is changed in the direction of reduced raw nitrogen oxide emission by lowering the target value for the raw nitrogen oxide emission. The internal combustion engine 1, especially the engine block 5, is then actuated on the basis of the changed at least one process parameter, namely with the lowered target value for the raw nitrogen oxide emission.

The SCR catalyst 7 in operation is permanently monitored for aging by the means of aging recognition 65.

The at least one process parameter, namely the target value for the raw nitrogen oxide emission, in an initial state of operation, is preferably set in the direction of fuel consumption-optimal operation of the internal combustion engine.

If aging is recognized, the at least one process parameter is preferably changed in the direction of a reduction in the raw nitrogen oxide emission when the raw emission is greater than a predetermined minimal raw nitrogen oxide emission, wherein the change in the process parameter is ended when the raw nitrogen oxide emission is greater than the predetermined minimal raw nitrogen oxide emission and no aging is recognized any longer, or when the raw nitrogen oxide emission reaches or goes below the level of the minimal raw nitrogen oxide emission.

It is preferably the case that, when aging is recognized, the at least one process parameter is kept constant when the raw nitrogen oxide emission reaches or goes below the level of the predetermined minimal raw nitrogen oxide emission.

It is additionally the case that the internal combustion engine 1 is switched into a second mode of operation when the raw nitrogen oxide emission reaches or goes below the level of the predetermined minimal raw nitrogen oxide emission, wherein closed-loop control of emission via the means of closed-loop emission control 23 in the second mode of operation is conducted on the basis of a determining parameter 28 for the nitrogen oxide concentration downstream of the SCR catalyst 7 that has been changed by the recognition of aging, namely the means of aging recognition 65.

There follows a detailed elucidation of the mode of function of the aging recognition and hence more particularly of the mode of function of the means of aging recognition 65.

Figure 3:
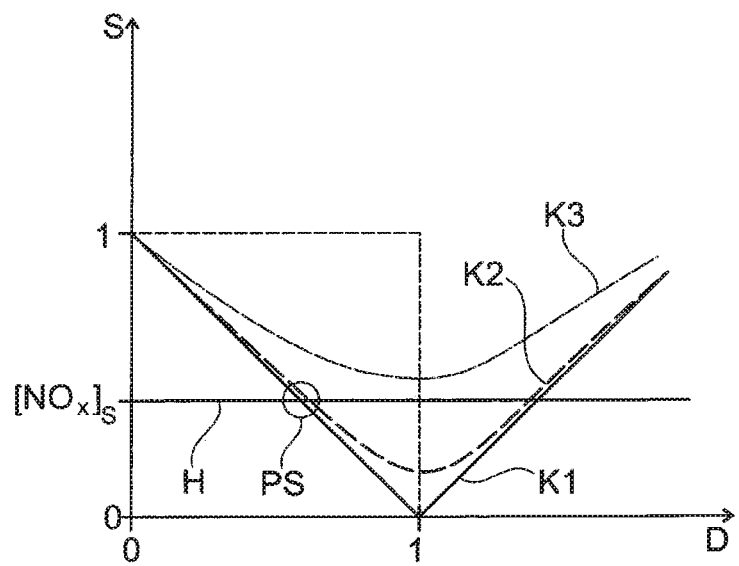
FIG. 3 a schematic diagrammatic representation of aging characteristics of an SCR catalyst and of a mode of function in principle for one embodiment of the method for recognition of aging.

FIG. 3 shows a schematic, diagrammatic representation of the mode of function of the method of aging recognition. Plotted here on a vertical axis of the diagram is a measurement S from the second nitrogen oxide sensor 15 as a measure of a combined nitrogen oxide and ammonia concentration in the exhaust gas downstream of the SCR catalyst 7, based on the raw emissions of nitrogen oxide from the engine block 5, such that the value 1 on the vertical axis corresponds to a state in which the raw nitrogen oxide emissions from the engine block 5 are allowed to pass completely through the SCR catalyst 7. Plotted on the horizontal axis is a dosage rate D of reducing agent or a reducing agent precursor product from the dosage unit 9, based on a conversion of the reducing agent in the SCR catalyst 7. The value identified by 1 corresponds here to a complete conversion of the total amount of reducing agent injected over the SCR catalyst 7.

The horizontal line H plotted onto the diagram is a target nitrogen oxide value $[NO_x]_S$, which is used as determining parameter within the method.

A first, solid curve K1 shows the behavior of an ideal SCR catalyst 7. Proceeding from a vanishingly small dosage rate where there is no conversion of nitrogen oxides over the SCR catalyst 7, there is a drop in the measurement S from the second nitrogen oxide sensor 15 with increasing dosage rate until, at the value of 1 for the dosage rate, i.e. a complete conversion of reducing agent over the SCR catalyst 7, there is complete reduction of the nitrogen oxides in the SCR catalyst 7, and so the signal from the second nitrogen oxide sensor 15 also becomes zero. If the dosage rate is increased over and above the value of 1, there is a rise in the measurement signal from the second nitrogen oxide sensor 15 again because unconverted reducing agent is now being allowed to pass through the SCR catalyst 7. In this respect, there is thus a breakthrough of the SCR catalyst 7, or slippage of reducing agent or ammonia. Owing to the cross-sensitivity of the second nitrogen oxide sensor 15 between nitrogen oxides on the one hand and ammonia on the other hand, this leads to a rising signal S from the second nitrogen oxide sensor 15. In a case in which an oxidation catalyst 17 is provided downstream of the SCR catalyst 7, unconverted ammonia in particular is oxidized up to nitrogen oxides, such that the measurement S at dosage rates greater than 1 rises here because nitrogen oxides which are produced from ammonia by the oxidation catalyst 17 are detected at the second nitrogen oxide sensor 15.

A second, dotted curve K2 shows, in principle, the mode of function of a real, as-new SCR catalyst 7. This departs from the ideal behavior in the respect that it especially has a maximum achievable conversion rate which is not 100% even in the new state, such that ultimately not all nitrogen oxides in the exhaust gas are actually reduced even when the reducing agent dosed in is fully converted over the SCR catalyst 7. Therefore, the dotted curve K2, unlike the first, solid curve K1 which describes the ideal behavior, does not tend to zero at the value of 1 for the dosage rate.

However, what is common to both curves K1, K2 is that each has a point of intersection, shown in a detail PS, with the target nitrogen oxide value $[NO_x]_S$ at values for the dosage rate of less than 1. Closed-loop control of the nitrogen oxide emissions is preferably effected in such a way that the dosage rate as manipulated variable is affected in such a way that the measurement signal from the second nitrogen oxide sensor 15 is kept within the region of this point of intersection.

A third curve K3 in the form of dashes and dots shows the behavior of an aged SCR catalyst 7 having a distinctly reduced maximum conversion rate. It is then possible that the maximum conversion is so low that, even in the case of a dosage rate of 1, the target nitrogen oxide value $[NO_x]_S$ is not attained, such that the third curve K3 no longer has a point of intersection with the target value and here especially with the horizontal line H. Stable closed-loop control of the nitrogen oxide emissions by variation of the dosage rate D is then no longer possible, resulting in a breakthrough for the SCR catalyst 7.

If a breakthrough for the SCR catalyst 7 is now recognized in the context of the method, the determining parameter is changed toward higher nitrogen oxide concentration downstream of the SCR catalyst 7, which means that the target value $[NO_x]_S$ is increased. This means specifically, with regard to the diagram of FIG. 3, that the horizontal line H is shifted upward in a parallel manner, preferably until a point of intersection with the third curve K3 is again established. Stable closed-loop control of the SCR catalyst 7 is then possible again in the second mode of operation.

It also becomes clear from the diagram of FIG. 3 why there can be a fall in this case in the actual nitrogen oxide emissions from the internal combustion engine 1 and especially in the nitrogen oxide concentration that actually occurs in the exhaust gas downstream of the SCR catalyst 7, even though the target value is being increased. This is because the SCR catalyst 7 at breakthrough ultimately produces undefined nitrogen oxide emissions that are not amenable to stable closed-loop control of emission. If, by contrast, a point of intersection between the horizontal line H and the third curve K3 is attained again, stable closed-loop control is possible again, such that the nitrogen oxide concentration downstream of the SCR catalyst 7 is established at the target nitrogen oxide value $[NO_x]_S$. It may especially fall by comparison with the operating state of the SCR catalyst 7 at breakthrough, but is established at an elevated value compared to the preceding target nitrogen oxide value.

If no breakthrough is recognized any longer because the emissions are now under stable closed-loop control, the target nitrogen oxide value $[NO_x]_S$ can be lowered again by way of a trial; more particularly, the horizontal line H can thus be shifted back downward in order to check whether the increase has possibly been too high in that stable closed-loop control of emission is still also possible at a lower target value. This lowering by way of a trial can especially be conducted incrementally until a breakthrough of the SCR catalyst 7 is recognized again. If this is the case, a last alteration increment in particular can be reversed, such that there is again a point of intersection of the horizontal line H with the third curve K3 and stable closed-loop control is possible.

Figure 4:
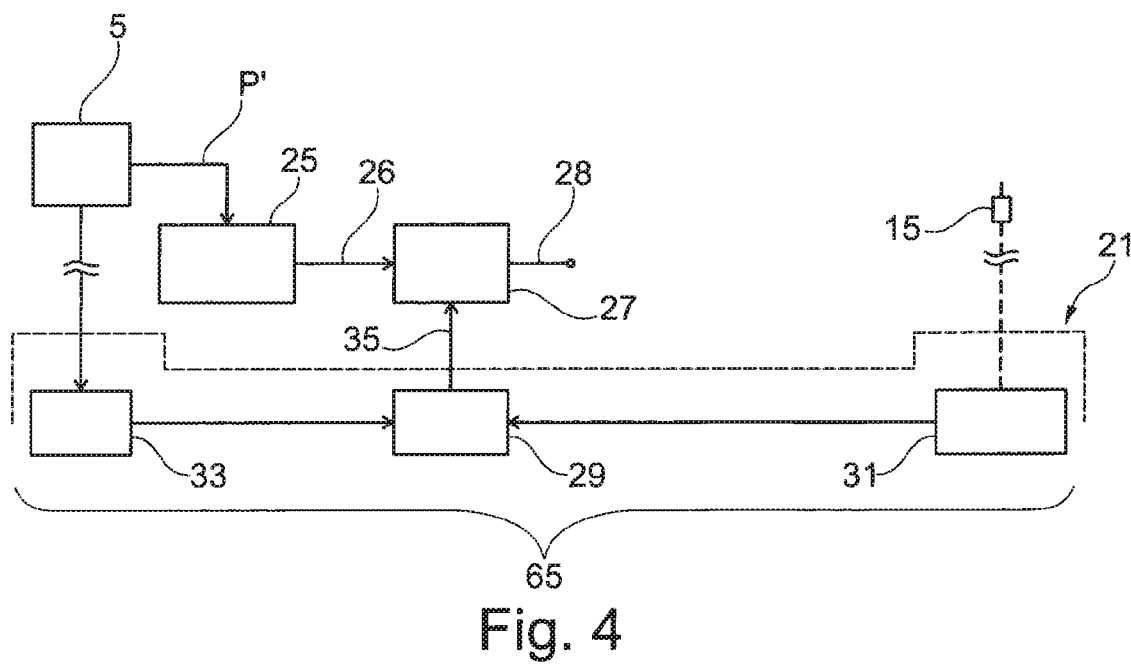
FIG. 4 a schematic diagram of a first embodiment of the method for recognition of aging.

FIG. 4 shows a schematic diagram of an embodiment of the method of aging recognition. Identical elements and those having the same function are given the same reference numerals, and so reference is made to the preceding description in this respect.

The breakthrough recognition element 31 is operatively connected to the second nitrogen oxide sensor 15 and set up to recognize breakthrough of the SCR catalyst 7. Accordingly, it reports to the calculation element 29 whether or not a breakthrough has been recognized.

The steady-state recognition element 33 is operatively connected to the engine block 5 in order to recognize whether there is a steady-state operating point. It reports to the calculation element 29 whether there is a steady-state operating point, and especially checks whether there are conditions under which the SCR catalyst 7 is also in a steady state.

The calculation element 29 transmits to the change element 27 the result of a calculation, namely a calculation result 35, which can itself firstly be an adaptation parameter, but secondly is also—in another embodiment of the method—calculated from the adaptation parameter.

The following in particular is apparent on joint viewing with FIG. 2: The dosage unit 9 in the second mode of operation is actuated via the means of closed-loop emission control 23 on the basis of the changed determining parameter 28 which is initially preferably equal to the determining parameter 26. Recognition of breakthrough for the SCR catalyst 7 is conducted by the breakthrough recognition element 31, and then, when a breakthrough is recognized, the determining parameter is changed by means of the calculation element 29 and the determination element 27 toward higher nitrogen oxide concentration downstream of the SCR catalyst 7, and then the dosage unit 9 for dosage of the reducing agent is actuated on the basis of the changed determining parameter 28.

The SCR catalyst 7 in operation is permanently monitored by the breakthrough recognition element 31 for a breakthrough.

It is preferably the case that the determining parameter 26 and, correspondingly, the changed determining parameter 28 are a target nitrogen oxide concentration downstream of the SCR catalyst, which are inputs into the means of closed-loop emission control 23 as target value.

In one embodiment of the method, the determining parameter 26 is changed by recalculation on the basis of an adaptation parameter, wherein, in this embodiment of the method, the calculation result 35 in particular is a determining parameter recalculated in the calculation element 29, which is allowed to pass through the change element 27 as changed determining parameter 28. The outcome is as follows: If no breakthrough is recognized, and the actual nitrogen oxide concentration downstream of the SCR catalyst is equal to the predetermined initial value of the determining parameter 26 from the characteristic map 25, the adaptation parameter in the calculation element 29 is equated to a predetermined inertial value, the result of which is that the predetermined initial value of the determining parameter 26 is used as the changed determining parameter 28. In this case, the change element 27 preferably takes the form of a maximum determination element which uses the determining parameter 26 on the one hand and the calculation result 35 on the other hand to form a maximum, and transmits the greater value, i.e. the maximum, as changed determining parameter 28 to the means of closed-loop emission control 23. Through the choice of the predetermined inertial value for the adaptation parameter in the calculation element 29—as will be elucidated in detail later on—the calculation result 35 is then chosen such that it is smaller than the determining parameter 26, such that, in this case, it is passed on to the means of closed-loop emission control 23 as changed determining parameter 28 by the determination element 27. The calculation and the significance of the calculation result 35 for this embodiment of the method will be elucidated in detail in connection with FIG. 6, and so reference is made thereto.

In another embodiment of the method, it is possible that a change in the determining parameter in the change element 27 is conducted by arithmetic combination of the initial value of the determining parameter 26 with the adaptation parameter, it being the case here that the calculation result 35 itself constitutes the adaptation parameter. The change element 27 takes the form here of an addition or summing element. The adaptation parameter is a predetermined differential nitrogen oxide concentration which is calculated by the calculation element 29. This is added to the initial value of the determining parameter 26 in the change element 27, and the result of this addition is passed on to the means of closed-loop emission control 23 as altered determining parameter 28.

In this embodiment of the method too, the adaptation parameter is preferably equal to a predetermined inertial value when the actual nitrogen oxide concentration downstream of the SCR catalyst 7 detected by the second nitrogen oxide sensor 15 is equal to the determining parameter 26. In this case, the predetermined inertial value of the adaptation parameter is preferably zero, and so the calculation result 35 is also then zero, in which case the determining parameter 26 in the change element 27 is not changed owing to the addition of zero, and the original determining parameter 26 is passed on to the means of closed-loop emission control 23 as changed determining parameter 28.

There follows a detailed elucidation of the manner in which the calculation result 35 is calculated in the calculation element 29.

Figure 5:
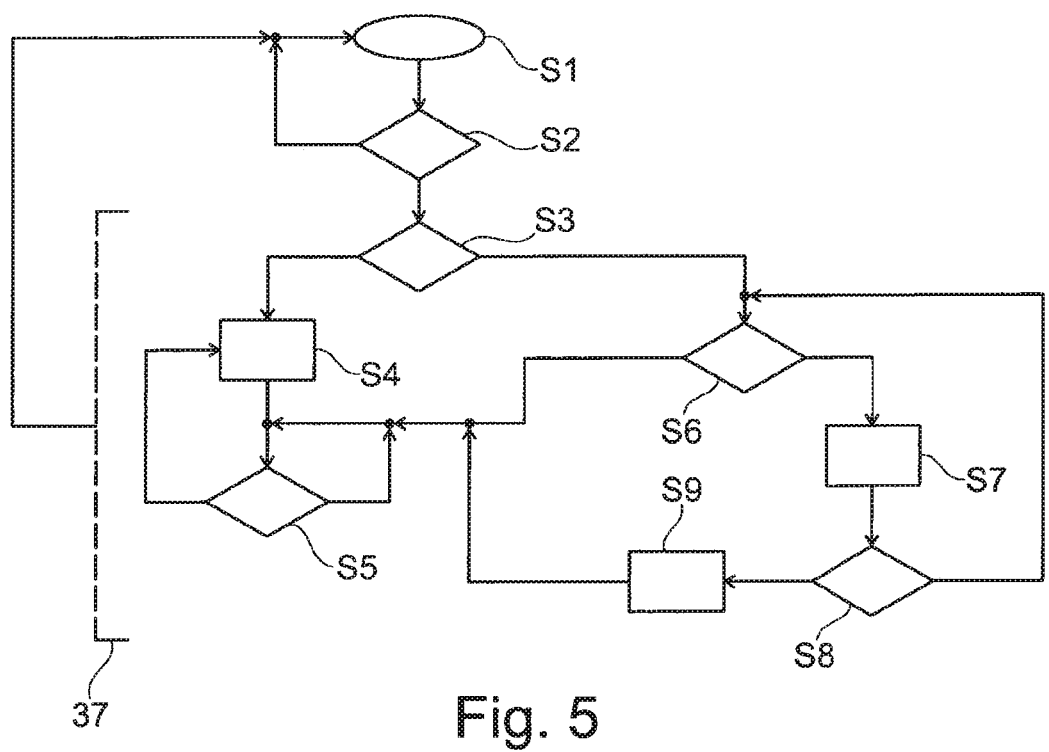
FIG. 5 a schematic diagram of a detail of an embodiment of the method for recognition of aging, and FIG. 6 a further detailed diagram of an embodiment of the method for recognition of aging.

FIG. 5 shows a schematic diagram of an embodiment of the method of aging recognition in the form of a flow diagram and especially a calculation of the calculation result 35 in the calculation element 29. The method starts in an initialization step S1. This is followed by a check in a second step S2 as to whether there are steady-state conditions over the SCR catalyst 7. For this purpose, more particularly, the result from the steady-state recognition element 33 is evaluated. If there is no steady state, the method returns to the first step S1 and starts again. If, by contrast, there are steady-state conditions for the SCR catalyst 7, the method advances to a third step S3 in which it is checked whether there is a breakthrough of the SCR catalyst 7. What is checked here is more particularly whether the breakthrough recognition element 31 is reporting a breakthrough or not.

If there is a breakthrough, the method advances to a fourth step S4 in which the adaptation parameter is changed—preferably incrementally. How the adaptation parameter is changed depends on the specific embodiment of the method. If the adaptation parameter is a predetermined nitrogen oxide conversion rate of the SCR catalyst 7, the adaptation parameter is reduced when a breakthrough is recognized. If the adaptation parameter, by contrast, is a predetermined differential nitrogen oxide concentration which is especially added onto the determining parameter 26 in the change element 27, the adaptation parameter is increased when a breakthrough is recognized. In both cases, the effect of the change in the adaptation parameter in the fourth step S4 is ultimately that the changed determining parameter 28 is changed toward a higher nitrogen oxide concentration downstream of the SCR catalyst. The method now jumps to a fifth step S5 in which there is again a check of whether there is a breakthrough of the SCR catalyst 7. If this is the case, the method returns to the fourth step S4, and the adaptation parameter is adjusted again—preferably incrementally, especially with constant increments. In that case, there then again follows the check in the fifth step S5 as to whether there is still a breakthrough at the SCR catalyst 7. This loop is iterated until no breakthrough at the SCR catalyst 7 is recognized any longer. In this case, the method follows a loop back to the fifth step S5, such that the SCR catalyst 7 is permanently monitored for breakthrough, with no change in the adaptation parameter and hence ultimately also in the determining parameter. The method only gets out of this loop when a global escape condition 37 that exists for all steps of the method from the third step S3 onward has been fulfilled, the global escape condition 37 stipulating that there is no longer any steady state of the SCR catalyst 7. If, more particularly, the steady state recognition element 33 recognizes that there are no steady-state conditions any longer, the method according to FIG. 5 is terminated and returns to the first step S1, where it starts again.

If a breakthrough of the SCR catalyst is recognized in the fifth step S5 in the meantime, the method jumps back to the fourth step S4 again, where the adaptation parameter is readjusted and hence the determining parameter is also changed.

If no breakthrough is recognized in the third step S3, the method advances to a sixth step S6 in which there is a check as to whether the adaptation parameter currently has its predetermined inertial value or already has a changed value other than the inertial value. If the adaptation parameter has its predetermined inertial value, the method jumps to the fifth step S5, and it is checked whether there is a breakthrough at the SCR catalyst 7. If this is the case, the method jumps to the fourth step S4 again; if this is not the case, the method moves to the permanent monitoring of breakthrough, with constant repetition of step S5, namely until either a breakthrough of the SCR catalyst 7 is recognized, or until there are no steady-state conditions any longer for the SCR catalyst 7, i.e. the global escape condition 37 is fulfilled.

If, in the sixth step S6, by contrast, it is found that the adaptation parameter has changed, i.e. no longer has its predetermined inertial value, the method advances to a seventh step S7 in which the adaptation parameter is changed counter to the direction of change in the fourth step S4, and preferably in an incremental manner, especially in constant increments. Thus, if the adaptation parameter is increased in the fourth step S4, it is lowered in the seventh step S7. If it is lowered in the fourth step S4, it is increased in the seventh step S7. This takes account of the idea that, in the case in which the adaptation parameter has already been altered but no breakthrough of the SCR catalyst 7 is being recognized in the third step S3, the change in the adaptation parameter in the fourth step S4 has possibly been too great, such that more favorable closed-loop control with regard to the emissions from the internal combustion engine 1 might be possible without breakthrough of the SCR catalyst 7. Therefore, the adaptation parameter in the seventh step S7 is changed back incrementally by way of a trial, and it is then checked in an eighth step S8 whether there is a breakthrough of the SCR catalyst 7 with the adaptation parameter that has been changed back in this way. The increment chosen in the seventh step S7 is preferably exactly the same as the increment in the fourth step S4.

If it is found in the eighth step S8 that there is no breakthrough of the SCR catalyst, this means that stable closed-loop control is also still possible with the adaptation parameter that has been set back by an increment. In this case, the method returns to the sixth step S6, and there is another check of whether the adaptation parameter that has now been set back has reached the predetermined inertial value again, or whether it is still changed proceeding from the predetermined inertial value. The method then either advances to the fifth step S5 if the predetermined inertial value has already been attained again, or the adaptation parameter is set back by a further increment in the seventh step S7, in which case it is then checked again in the eighth step S8 whether there is now a breakthrough of the SCR catalyst 7.

If there is again no breakthrough of the SCR catalyst 7, this method is continued, until it is either found in the sixth step S6 that the predetermined inertial value has been attained or until a breakthrough of the SCR catalyst 7 is recognized in the eighth step S8.

This means that stable closed-loop emission control is no longer possible with the adaptation parameter resulting from the seventh step S7 that has been set back in this way.

Therefore, in a ninth step S9, the last incremental alteration of the adaptation parameter that has been conducted in the seventh step S7 is now discarded, and hence the value of the adaptation parameter that it had prior to the last change in the seventh step S7 is restored. The method then skips to the fifth step S5 in which there is again a check of whether there is a breakthrough of the SCR catalyst 7.

As already indicated, all steps S3, S4, S5, S6, S7, S8, S9 are abandoned when the global escape condition 37 has been fulfilled, i.e. there are no steady-state conditions any longer for the SCR catalyst 7. The method is accordingly terminated in this case and returns to the first step S1, proceeding from which it is conducted again.

However, the last value of the adaptation parameter which has been determined in the fourth step S4 or in the seventh step S7 is preferably maintained, such that it is available again in a next run of the method.

It is especially the case that data for determination of the adaptation parameter during a first adaptation period, especially a first run of the method proceeding from the first step S1, are recorded in a overwritable characteristic map, namely a learning characteristic map, and they are provided in a second adaptation period, especially namely in a second run of the method proceeding from the first step S1, the second adaptation period following after the first adaptation period in time. Thus, if the method is terminated especially owing to a non-steady state at the SCR catalyst 7 or in the operation of the internal combustion engine 1, the last value of the adaptation parameter attained is then available again in a next method run.

However, it is preferably the case that the overwritable characteristic map, especially the learning characteristic map, is not written with data in predetermined states of operation of the exhaust gas aftertreatment system 3 or units operatively connected thereto, especially of the internal combustion engine 1. These are especially states of operation in which, owing to their irregularity or owing to defects that occur in these states of operation, maladjustment of the closed-loop emission control would take place if the adjusted adaptation parameters attained in these states were to be recorded in the learning characteristic map.

It is also possible that, in particular states of operation of the exhaust gas aftertreatment system 3 or units operatively connected thereto, especially of the internal combustion engine 1, no change in the adaptation parameter takes place if this does not seem sensible owing to the specific nature of such states of operation.

It is preferably the case that, on attainment or exceedance of a limit in the adaptation parameter, especially in the fourth step S4 and/or in the seventh step S7, or on attainment or exceedance of a limit in the actual nitrogen oxide concentration downstream of the SCR catalyst 7, a warning signal is generated. This may for example indicate to an operator of the exhaust gas aftertreatment system 3 and/or the internal combustion engine 1 that the SCR catalyst 7 has to be exchanged. Alternatively or additionally, in such a case, it is preferable that a decrease in the nitrogen oxide concentration upstream of the SCR catalyst 7 is initiated. For this purpose, preferably, the engine block 5 of the internal combustion engine 1 is actuated with changed parameters in order to bring about lowering of the raw nitrogen oxide emissions. In this case, it may be possible to also still continue to use the aged SCR catalyst 7 before it ultimately has to be exchanged.

Figure 6:
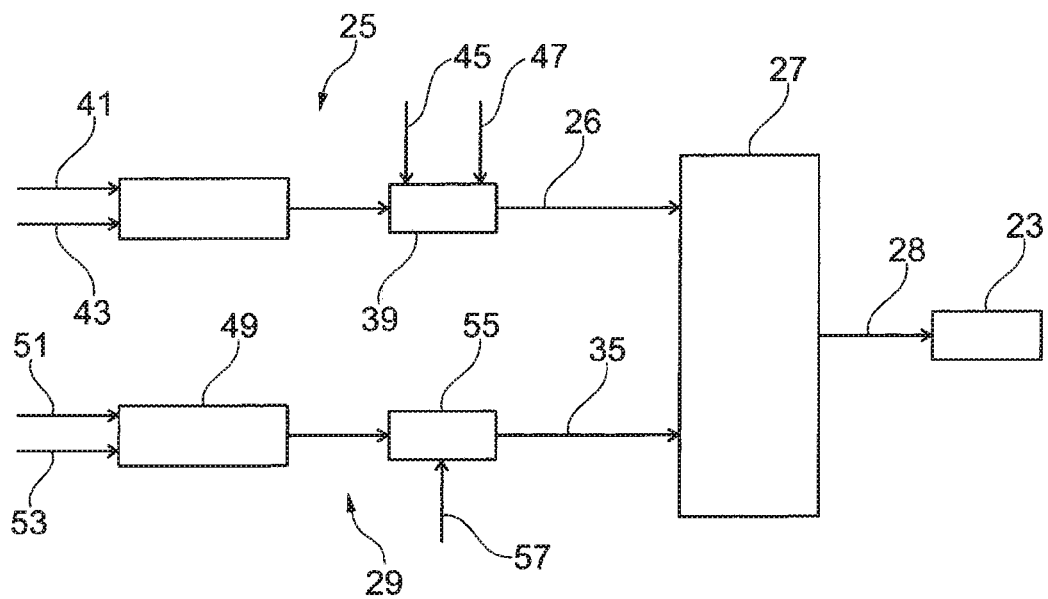

FIG. 6 shows a schematic diagram of an embodiment of the method of aging recognition, wherein the adaptation parameter in this embodiment is a predetermined nitrogen oxide conversion rate of the SCR catalyst, wherein FIG. 6 gives a detailed elucidation of the mode of function of the calculation element 29 and of the change element 27 for this embodiment.

The characteristic map 25 here is additionally connected to a first conversion element 39. Inputs into the characteristic map 25 are—as already described—a current speed 41 and a current torque 43 of the internal combustion engine 1. Preferably recorded in the characteristic map 25 are target values for the nitrogen oxide emissions from the internal combustion engine 1 in unit mass per unit power, especially in grams per kilowatt hour (g/kWh), which are converted in the first conversion element 39 as a function of a current mass of exhaust gas 45 which is preferably calculated using a model in the control unit 21 of the internal combustion engine 1, and as a function of a current power 47 of the internal combustion engine which is preferably likewise calculated in the control unit 21 of the internal combustion engine 1, to a nitrogen oxide concentration in the exhaust gas, preferably in ppm. This target nitrogen oxide concentration which results from the first conversion element 39 is preferably the determining parameter 26 which is passed on to the change element 27.

Recorded in the calculation element 29 is preferably a learning characteristic map 49 in which a predetermined nitrogen oxide conversion rate of the SCR catalyst 7 is recorded as adaptation parameter. It is possible that the learning characteristic map 49 is at first initialized with a predetermined nitrogen oxide conversion rate of 100% or 1. Alternatively or additionally, it is also possible that—especially in test bench trials—a maximum conversion rate of the SCR catalyst is calculated firstly from the raw emissions from the internal combustion engine 1 and secondly from the target values of the determining parameter 26, and then the learning characteristic map 49 is initialized with these values.

The values for the adaptation parameter are recorded in the learning characteristic map 49, especially as a function of a temperature 51 of the SCR catalyst 7 and as a function of a current exhaust gas mass flow rate 53, wherein the current exhaust gas mass flow rate 53 is preferably determined in the control unit 21 of the internal combustion engine 1.

The calculation element 29 also has a second conversion element 55 in which the conversion rate read out in an operating point-dependent manner from the learning characteristic map 49 is converted as a function of the raw emissions 57 measured by means of the second nitrogen oxide sensor 19 or calculated in the control unit 21 of the internal combustion engine 1 to a target nitrogen oxide concentration, preferably in ppm, which is passed on to the change element 27 as calculation result 35.

The change element 27 in this case is a maximization element which forms a maximum from the determining parameter 26 on the one hand and the calculation result 35 on the other hand, and in this respect transmits the greater of the two values as changed determining parameter 28 to the means of closed-loop emission control 23.

The values of the adaptation parameter recorded in the learning characteristic map 49 or the corresponding data are especially changed when there is a breakthrough of the SCR catalyst 7, or when they have already been changed and there is no longer any breakthrough of the SCR catalyst 7. More particularly, the values in the learning characteristic map 49 are changed in the course of the method elucidated in connection with FIG. 5, especially in the fourth step S4 or in the seventh step S7 therein.

If the adaptation parameter in this embodiment of the method is equal to the predetermined inertial value, which may, for example, be 100% or 1, the effect of this is that the calculation result 35 is smaller in each case than the determining parameter 26, such that it is passed on by the change element 27 as changed determining parameter 28 to the means of closed-loop emission control 23.

Overall, it is found that, by means of the method, the control unit 21, the exhaust gas aftertreatment system 3 and the internal combustion engine 1, an aging reserve of an as-new SCR catalyst 7 can advantageously be exploited in order to tune the internal combustion engine 1 for low consumption at the start of its service life or a lifetime of the SCR catalyst 7. It is thus no longer necessary to operate the internal combustion engine 1 unfavorably from the start merely because conversion rates of the SCR catalyst 7 decline toward the end of the lifetime thereof.

The invention claimed is:

1. A method of operating a system having an internal combustion engine and an exhaust gas aftertreatment system comprising an SCR catalyst, the method comprising the steps of:
   actuating the internal combustion engine based on at least one process parameter that affects raw nitrogen oxide emission;
   conducting aging recognition for the SCR catalyst;
   in a first mode of operation of the internal combustion engine, changing the at least one process parameter in a direction of reduced raw nitrogen oxide emission when aging of the SCR catalyst is recognized; and
   actuating the internal combustion engine based on the changed at least one process parameter, wherein
   when aging is recognized, the at least one process parameter is changed in the direction of a reduction in the raw nitrogen oxide emission when the raw nitrogen oxide emission is greater than a predetermined minimal raw nitrogen oxide emission, wherein
   the change in the process parameter is ended when
   a) the raw nitrogen oxide emission is greater than the predetermined minimal raw nitrogen oxide emission and no aging is detected any longer, or when
   b) the raw nitrogen oxide emission reaches or goes below the level of the minimal raw nitrogen oxide emission.

2. The method according to claim 1, wherein the SCR catalyst in operation is monitored permanently for aging.

3. The method according to claim 1, including adjusting the at least one process parameter in an initial state of operation in a direction of fuel consumption-optimal operation of the internal combustion engine.

4. The method according to claim 1, including keeping the at least one process parameter constant when aging is recognized and when, simultaneously, the raw nitrogen oxide emission reaches or goes below the level of the predetermined minimal raw nitrogen oxide emission.

5. The method according to claim 1, including switching the internal combustion engine to a second mode of operation when the raw nitrogen oxide emission reaches or goes below a level of the predetermined minimal raw nitrogen oxide emission, wherein closed-loop control of emission in the second mode of operation is conducted based on a determining parameter for a nitrogen oxide concentration downstream of the SCR octal which is changed by the recognition of aging.

6. An exhaust gas aftertreatment system for an internal combustion engine, comprising:
an SCR catalyst; and
a control unit including: a closed-loop control configured to actuate the internal combustion engine based on at least one process parameter that affects raw nitrogen oxide emission; and an aging recognition configured to conduct recognition of aging for the SCR catalyst, and in a first mode of operation of the internal combustion engine, when aging is recognized, to change the at least one process parameter in a direction of reduced raw nitrogen oxide emission, wherein
the closed-loop control is configured to actuate the internal combustion engine based on the at least one changed process parameter, wherein
when aging is recognized, the at least one process parameter is changed in the direction of a reduction in the raw nitrogen oxide emission when the raw nitrogen oxide emission is greater than a predetermined minimal raw nitrogen oxide emission, wherein
the change in the process parameter is ended when
a) the raw nitrogen oxide emission is greater than the predetermined minimal raw nitrogen oxide emission and no aging is detected any longer, or when
b) the raw nitrogen oxide emission reaches or goes below the level of the minimal raw nitrogen oxide emission.

* * * * *